(12) United States Patent
Caprez et al.

(10) Patent No.: US 10,960,616 B2
(45) Date of Patent: Mar. 30, 2021

(54) REUSABLE VACUUM BAG PROCESS

(71) Applicant: Industrial Technologies Inc., Akron, OH (US)

(72) Inventors: Gregg Caprez, Akron, OH (US); Maxwell Caprez, Akron, OH (US); Joel Morrison, Akron, OH (US)

(73) Assignee: Industrial Technologies Inc., Akron, OH (US)

( * ) Notice: Subject to any disclaimer, the term of this patent is extended or adjusted under 35 U.S.C. 154(b) by 341 days.

(21) Appl. No.: 15/919,644

(22) Filed: Mar. 13, 2018

(65) Prior Publication Data

US 2019/0039335 A1 Feb. 7, 2019

Related U.S. Application Data

(60) Provisional application No. 62/541,380, filed on Aug. 4, 2017.

(51) Int. Cl.
  *B29C 70/44* (2006.01)
  *B29C 45/73* (2006.01)
  *B29K 83/00* (2006.01)

(52) U.S. Cl.
  CPC .............. *B29C 70/44* (2013.01); *B29C 45/73* (2013.01); *B29C 2793/009* (2013.01);
  (Continued)

(58) Field of Classification Search
  CPC ........ B29C 43/3642; B29C 2043/3644; B29C 33/3885
  See application file for complete search history.

(56) References Cited

U.S. PATENT DOCUMENTS 4,842,670 A * 6/1989 Callis .................. B29C 43/3642
156/285
5,439,631 A 8/1995 Schneider et al.
(Continued)

OTHER PUBLICATIONS

Mosites Rubber Company, Inc. "Silicone Rubber Technical Information." Published in 2015. Retrieved online on Aug. 5, 2017 from http://www.mositesrubber.com/technical/technical-info/silicone-rubber/.

*Primary Examiner* — Jacob T Minskey
*Assistant Examiner* — Virak Nguon
(74) *Attorney, Agent, or Firm* — Eschweiler & Potashnik, LLC

(57) ABSTRACT

Various embodiments of the present application are directed towards a method for forming a reusable vacuum bag, as well as the reusable vacuum bag resulting from the method. In some embodiments, the method comprises providing a mold. The mold comprises a pair of plates that collectively define a cavity with layout of a reusable vacuum bag. A vacuum bag material is added to the cavity. For example, silicone may be added (e.g., injected or poured) into a cavity. The vacuum bag material is cured within the cavity to form the reusable vacuum bag. The reusable vacuum bag is thereafter removed from the mold. In some embodiments, the reusable vacuum bag resulting from the method comprises an integrated vacuum seal, an integrated sensor pad, an integrated vacuum port pad, an integrated vacuum track, uniform wall thicknesses, tapered or rounded edges, or any combination of the foregoing.

20 Claims, 20 Drawing Sheets

(52) U.S. Cl.
CPC .. *B29C 2793/0027* (2013.01); *B29K 2083/00* (2013.01); *B29K 2883/00* (2013.01)

(56) References Cited

U.S. PATENT DOCUMENTS

| | | | | |
|---|---|---|---|---|
| 5,716,488 | A * | 2/1998 | Bryant | B29C 43/3642 156/286 |
| 6,113,827 | A * | 9/2000 | Styczynski | B29C 45/14336 264/161 |
| 7,029,267 | B2 | 4/2006 | Caron | |
| 2004/0115299 | A1 * | 6/2004 | Potter | B29C 70/54 425/389 |
| 2007/0063378 | A1 * | 3/2007 | O'Donoghue | B29C 33/40 264/219 |
| 2008/0211130 | A1 * | 9/2008 | Rydin | B29C 33/405 264/102 |
| 2010/0112117 | A1 * | 5/2010 | Ross | B29C 70/443 425/388 |
| 2014/0008845 | A1 * | 1/2014 | Huda | B29C 35/02 264/511 |
| 2014/0050813 | A1 * | 2/2014 | Balas | B29C 43/18 425/388 |
| 2017/0008201 | A1 * | 1/2017 | Siagam | B29D 99/0014 |
| 2017/0225409 | A1 * | 8/2017 | Lauzon | B29C 33/3842 |

* cited by examiner

REUSABLE VACUUM BAG PROCESS

REFERENCE TO RELATED APPLICATIONS

This Application claims the benefit of U.S. Provisional Application No. 62/541,380, filed on Aug. 4, 2017, the contents of which are hereby incorporated by reference in their entirety.

BACKGROUND

A composite material is a combination of two or more individual materials with different physical or chemical properties that, when combined, produce a material with characteristics different from the individual materials. Compared to traditional materials (e.g., non-composite materials), composite materials may be stronger, lighter, or less expensive, such that composite materials have a wide range of applications. Among other things, composite materials find application in buildings, bridges, boat hulls, swimming pool panels, race car bodies, shower stalls, bathtubs, spacecraft, and aircraft. One approach for forming structures from composite materials includes vacuum bag molding.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
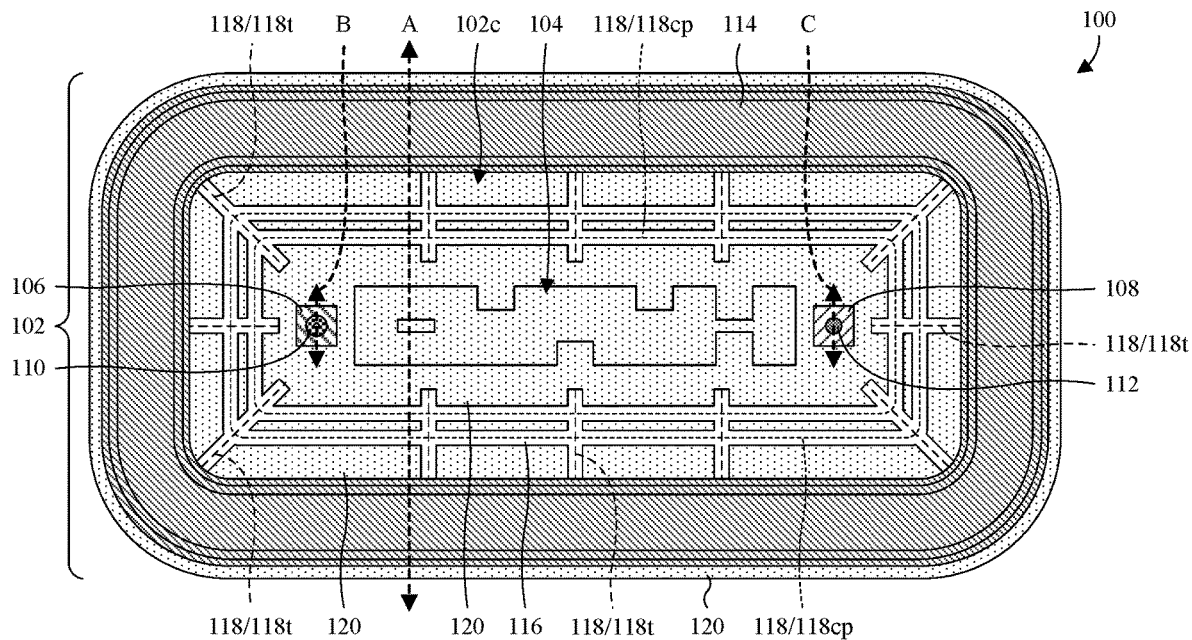
FIG. 1 illustrates a top view of some first embodiments of a reusable vacuum bag.

The present disclosure provides many different embodiments, or examples, for implementing different features of this disclosure. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

Vacuum bag molding is a method to form structures from composite materials. According to some vacuum bag molding methods, prepregs are stacked over a bottom plate. A prepreg may, for example, be a layer of fibers impregnated with a polymer or resin. A vacuum bag is placed over the bottom plate, such that the vacuum bag and the bottom plate define a cavity within which the prepregs are arranged. The vacuum bag is a sheet, liner, or membrane that is flexible and gas impervious. A vacuum is drawn on the vacuum bag, and atmospheric pressure, or some other pressure (e.g., pressure from an autoclave), compresses the prepregs through the vacuum bag. The compression induces the prepregs to meld, and to further conform to a pattern on an upper side of the bottom plate and a pattern on an underside of the vacuum bag. The melded prepregs are then cured to form a composite structure.

According to a method for forming a reusable vacuum bag, an uncured silicone sheet is manually formed to a lay-up tool. The lay-up tool may be, for example, a sheet metal mandrel, a production composite part, or some other model or master to which the uncured silicon sheet is formed. To form the uncured silicone sheet to the lay-up tool, the uncured silicone sheet is cut according to a pattern complementary to the lay-up tool. For example, slits or cuts may be formed at regions of the uncured silicone sheet corresponding to corners on the lay-up tool. The uncured silicone sheet is then placed on the lay-up tool and is pressed into place. Further, the uncured silicone sheet is overlapped, butt jointed, or stitched at joints or seams, which may, for example, correspond to corners on the lay-up tool. Overlaps are feathered, and additional uncured silicone is applied to areas where the uncured silicone sheet may have been thinned by feathering. Vacuum port pads and/or thermocouple pads is/are added to the formed silicone sheet, and the formed silicone sheet is cured while on the lay-up tool. Upon completion of the curing, the cured silicone sheet may be used as a reusable vacuum bag. Further, additional features may, for example, be added to the cured silicone sheet. The additional features may, for example, be added to the cured silicone sheet by an adhesive, and/or may, for example, include vacuum ports, thermocouples, vacuum seals, vacuum tracks, and other features.

A challenge with the method for forming the reusable vacuum bag is that the method is highly labor intensive. This, in turn, increases costs and subjects the reusable vacuum bag to flaws and non-uniformities by human error. Further, because the reusable vacuum bag is formed, in part, by cutting the uncured silicone sheet, and subsequently overlapping and feathering the uncured silicone sheet at joints, the reusable vacuum bag is structurally weakened at the joints and/or may have non-uniform sidewalls. This, in turn, reduces the life of the reusable vacuum bag, which is further exacerbated by use of the reusable vacuum bag at high temperatures (e.g., temperatures greater than about 200, 300, or 400 degrees Fahrenheit (° F.)). Further yet, because features (e.g., vacuum seals) are added to the reusable vacuum bag after curing, the reusable vacuum bag is prone to failure at these features.

In view of the foregoing, various embodiments of the present application are directed towards an enhanced method for forming a reusable vacuum bag, as well as the reusable vacuum bag resulting from the enhanced method. In some embodiments, the enhanced method comprises casting or injection molding a reusable vacuum bag. For example, silicone may be added (e.g., injected or poured) into a cavity of a mold or master, and subsequently cured, to form the reusable vacuum bag. In some embodiments, the reusable vacuum bag resulting from the enhanced method comprises an integrated vacuum seal, an integrated sensor pad, an integrated vacuum port pad, an integrated vacuum track, uniform wall thicknesses, tapered or rounded edges, or any combination of the foregoing.

By casting or molding the reusable vacuum bag, human intervention is reduced. The reduced human intervention, in turn, reduces the risk of human error and improves uniformity. Further, by casting or molding the reusable vacuum bag, the reusable vacuum bag may be devoid of seams, and/or may have regions of increased wall thickness and/or rounded corners to reduce stress points. The reduced human intervention, the lack of seams, and the reduced stress points, in turn, lead to a more durable vacuum bag with a longer mean times before failure (MTBFs), even in the presence of elevated temperatures. Further, by casting or molding the reusable vacuum bag, the reusable vacuum bag may be more quickly formed and may cost less. Further, by casting or molding the reusable vacuum bag, the reusable vacuum bag may have a vacuum seal, a vacuum track, and other features integrated with the reusable vacuum bag.

With reference to FIG. 1, a top view 100 of some first embodiments of a reusable vacuum bag 102 is provided. Solid lines may, for example, represent edges of the reusable vacuum bag 102 and/or contours of the reusable vacuum bag 102. As illustrated, the reusable vacuum bag 102 is a single, continuous piece of material free of seams and other discontinuities, such that the reusable vacuum bag 102 is not subject to weakness introduced by seams and other discontinuities. Accordingly, the reusable vacuum bag 102 has high durability and a long MTBF. Further, seams and other discontinuities have a high propensity to fail in the presence of high temperatures. Because reusable vacuum bag 102 is free of seams and other discontinuities, the reusable vacuum bag 102 has high resilience to the high temperatures. The high temperatures may, for example, include temperatures greater than about 200, 300, or 400° F., and/or temperatures between about 300-400° F., about 200-300° F., or about 300-400° F.

In some embodiments, the reusable vacuum bag 102 flexible and/or impervious to air and other gases (e.g., water vapor, oxygen gas, nitrogen gas, etc.). In some embodiments, the reusable vacuum bag 102 has a high elongation. Such a high elongation may, for example, be an elongation greater than 100%, 200%, 500%, or 1000%, and/or may, for example, be between about 100-300%, 300-700%, or about 700-1000%. In some embodiments, the reusable vacuum bag 102 is or comprises silicone, ethylene propylene diene monomer (EPDM) rubber, butyl rubber, a fluoroelastomer, a nitrile rubber, some other polymer or rubber, or any combination of the foregoing. In some embodiments, the reusable vacuum bag 102 is limited to a single material (e.g., silicone or some other material). In some embodiments, the reusable vacuum bag 102 is used for: composites; bonding operations; pre-forms; debulking; polymer matrix composites (PMC); ceramic matrix composites (CMC); or any combination of the foregoing.

In some embodiments, the reusable vacuum bag 102 has a pattern 104 in a central area 102c of the reusable vacuum bag 102. The pattern 104 varies depending upon application of the reusable vacuum bag 102 and may, for example, be transferred to a target layer (not shown) during use of the reusable vacuum bag 102. In some embodiments, during use of the reusable vacuum bag 102, the target layer is arranged on a bottom plate (not shown), and the reusable vacuum bag 102 is arranged over the target layer. The reusable vacuum bag 102 is sealed to the bottom plate to define a cavity within which the target layer is arranged, and a vacuum is formed in the cavity. The vacuum causes a pressure differential between the cavity and an ambient environment of the cavity, whereby the ambient environment presses the reusable vacuum bag 102 against the target layer to transfer the pattern 104 to the target layer.

In some embodiments, the reusable vacuum bag 102 has a vacuum port pad 106 and/or a sensor pad 108 in the central area 102c of the reusable vacuum bag 102. The vacuum port pad 106 provides a pad to which a vacuum port 110 may be mounted. The vacuum port 110 provides a port to which a vacuum pump (not shown) may be coupled to create a vacuum in a cavity between the reusable vacuum bag 102 and a bottom plate (not shown). The sensor pad 108 provides a pad to which a sensor 112 may be mounted. The sensor 112 measures a parameter of the cavity, and/or may be, for example, a thermocouple, some other type of temperature sensor, a pressure sensor, or some other type of sensor.

In some embodiments, the reusable vacuum bag 102 has a vacuum seal 114. The vacuum seal 114 facilitates the hermetic sealing of a cavity between the reusable vacuum bag 102 and a bottom plate (not shown) during use of the reusable vacuum bag 102. Further, the vacuum seal 114 extends laterally in a closed path to surround and demarcate the central area 102c of the reusable vacuum bag 102. In some embodiments, the vacuum seal 114 is square ring shaped, rectangular ring shaped, triangular ring shaped, oval ring shaped, circular ring shaped, or some other closed path shape. Further, in some embodiments, the vacuum seal 114 is continuous and free of splices, seams, and other discontinuities.

In some embodiments, the reusable vacuum bag 102 has a vacuum track 116 in the central area 102c of the reusable vacuum bag 102. The vacuum track 116 surrounds the pattern 104 and defines a plurality of vacuum track channels 118. For ease of illustration, only some of the vacuum track channels 118 are labeled 118. In some embodiments, the vacuum track channels 118 comprise two closed-path vacuum track channels 118cp, each extending laterally in a closed path to surround the pattern 104. The closed-path vacuum track channels 118cp may, for example, be square ring shaped, rectangular ring shaped, triangular ring shaped, circular ring shaped, or some other closed path shape. Further, in some embodiments, the vacuum track channels 118 comprise a plurality of transverse vacuum track channels 118t extending transverse to the closed-path vacuum track channels 118cp. For ease of illustration, only some of the transverse vacuum track channels 118t are labeled 118t.

While creating a vacuum in a cavity between the reusable vacuum bag 102 and a bottom plate (not shown), the vacuum track channels 118 facilitate even distribution of the vacuum throughout the cavity and prevent pockets of air and/or other gases from forming. For example, while creating the vacuum, a vacuum pump (not shown) may create suction at a vacuum port (e.g., vacuum port 110) for the cavity. The suction causes the reusable vacuum bag 102 to deform and press against the bottom plate. Depending upon, among other things, a layout of the reusable vacuum bag 102 and the location of the vacuum port, the reusable vacuum bag 102 may sufficiently deform and sufficiently press against the bottom plate to create a weak seal sectioning off a portion of the cavity and hence creating the pockets of air and/or other gases. The reusable vacuum bag 102 may have increased rigidity at the vacuum track channels 118 (e.g., due to sidewalls of the vacuum track 116), such that the reusable vacuum bag 102 may resist deformation at the vacuum track channels 118 and the vacuum track channels 118 may persist long into the vacuuming. Therefore, the vacuum may evenly distribute throughout the cavity without pockets of air and/or other gases forming. In some embodiments, the vacuum track channels 118 (e.g., the transverse vacuum track channels 118t) adjoin the vacuum seal 114 to ensure the vacuum reaches the vacuum seal 114.

Because the reusable vacuum bag is a single, continuous piece of material free of seams and other discontinuities, it should be appreciated that the pattern 104, the vacuum port pad 106, the sensor pad 108, the vacuum seal 114, and the vacuum track 116 are integrated with the reusable vacuum bag 102. As such, these features each correspond to an individual region of the reusable vacuum bag 102. The integration eliminates points of failure associated with manually attaching a feature (e.g., the vacuum seal 114) to the reusable vacuum bag 102 by an adhesive or some other mechanism. Therefore, the integration improves the durability of the reusable vacuum bag 102. Further, the integration eliminates costs associated with manually attaching a feature to the reusable vacuum bag 102.

In some embodiments, the reusable vacuum bag 102 is a "cast" of a mold, whereby the reusable vacuum bag 102 is formed by curing or otherwise hardening a material (e.g., silicone) within the mold. In these and other embodiments, human involvement is low compared to reusable vacuum bags formed by manually layering and stitching silicone sheets together. As such, the risk of human error is low and the reusable vacuum bag 102 has high uniformity. For example, wall thickness of the reusable vacuum bag may have high intra-bag uniformity, and/or high inter-bag uniformity when formed in bulk. The high uniformity improves heat absorption by the reusable vacuum bag 102, such that the reusable vacuum bag 102 has high temperature resilience. Further, the low risk of human error and the high uniformity improve the durability of the reusable vacuum bag. Further yet, the time to produce the reusable vacuum bag 102 is low due to the reduced human involvement. For example, the time to produce the reusable vacuum bag 102 may be a few days as opposed to a week or more.

While the reusable vacuum bag 102 is illustrated as including the pattern 104, the vacuum port pad 106, the sensor pad 108, the vacuum seal 114, and the vacuum track 116, it is to be appreciated that any one of these features or a combination of these features may be omitted in other embodiments. For example, the vacuum port pad 106 and/or the sensor pad 108 may be omitted in other embodiments. Further, note that hashing of the vacuum port pad 106, hashing of the sensor pad 108, hashing of the vacuum seal 114, and hashing of the vacuum track 116 have been varied relative to each other and relative to a remainder 120 of the reusable vacuum bag 102 to emphasize these features. It is to be understood that the variation in hashing is not to be construed as limiting the composition of the reusable vacuum bag 102.

Figure 2A:
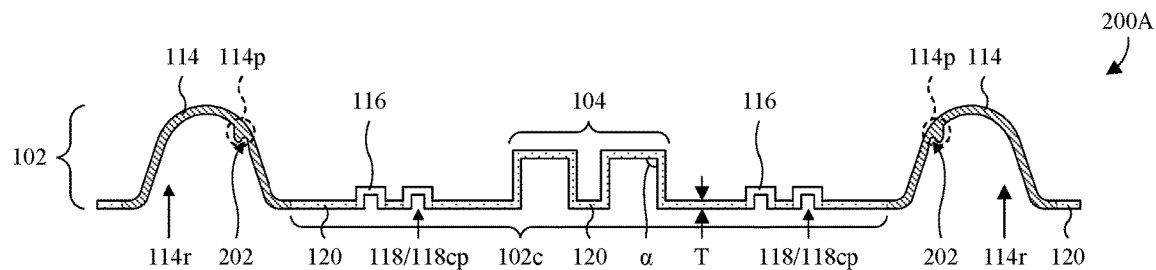
FIGS. 2A-2D illustrate cross-sectional views of various embodiments of the reusable vacuum bag of FIG. 1.

With reference to FIG. 2A, a cross-sectional view 200A of some first embodiments of the reusable vacuum bag 102 of FIG. 1 is provided. The cross-sectional view 200A may, for example, be taken along line A in FIG. 1. As illustrated, a thickness T of the reusable vacuum bag 102 is uniform or substantially uniform. As used herein, a "substantially" uniform thickness may, for example, be a thickness with a variation less than about 10%, 5%, or 1% of a mean or median thickness. The thickness T may, for example, be uniform or substantially uniform due to formation of the reusable vacuum bag 102 using a mold.

Additionally, the vacuum seal 114 has a pair of vacuum seal segments respectively on opposite sides of the reusable vacuum bag 102, such that the central area 102c of the reusable vacuum bag 102 is sandwiched between the vacuum seal segments. Each of the vacuum seal segments defines a portion of a seal recess 114r on an underside of the reusable vacuum bag 102. In some embodiments, the seal recess 114r has an inverted U-shaped or V-shaped profile at each of the vacuum seal segments. Further, in some embodiments, the seal recess 114r extends laterally in a closed path along a boundary of the central area 102c of the reusable vacuum bag 102 when viewed top down. In some embodiments, edges of the reusable vacuum bag 102 are rounded to reduce stress points and points of failure, thereby enhancing durability of the reusable vacuum bag 102. For example, edges at the vacuum seal 114 may be rounded.

During use of the reusable vacuum bag 102, the vacuum seal 114 is configured to mate with an upward protrusion of a bottom plate (not shown), such that the vacuum seal 114 receives the upward protrusion at the seal recess 114r. The upward protrusion is complementary to the seal recess 114r (e.g., has matching layout), such that that the mating strongly hermetically seals a cavity between the reusable vacuum bag 102 and the bottom plate. In some embodiments, the vacuum seal 114 has a seal channel 202 within the seal recess 114r and/or a seal protrusion 114p within the seal recess 114r. In some embodiments, the seal protrusion 114p borders the seal channel 202. In some embodiments, the seal channel 202 and/or the seal protrusion 114p each extends laterally in a closed path along a boundary of the central area 102c of the reusable vacuum bag 102 when viewed top down. For example, the seal channel 202 and/or the seal protrusion 114p is/are ring-shaped.

While creating a vacuum in the cavity, the seal channel 202 facilitates even distribution of the vacuum along the seal recess 114r. Additionally, the seal protrusion 114p protrudes into the seal recess 114r, thereby promoting enhanced contact between the vacuum seal 114 and the upward protrusion of the bottom plate during mating. The enhanced contact and the even distribution of the vacuum along the seal recess 114r may, for example, enhance the seal quality of the cavity.

Figure 2B:
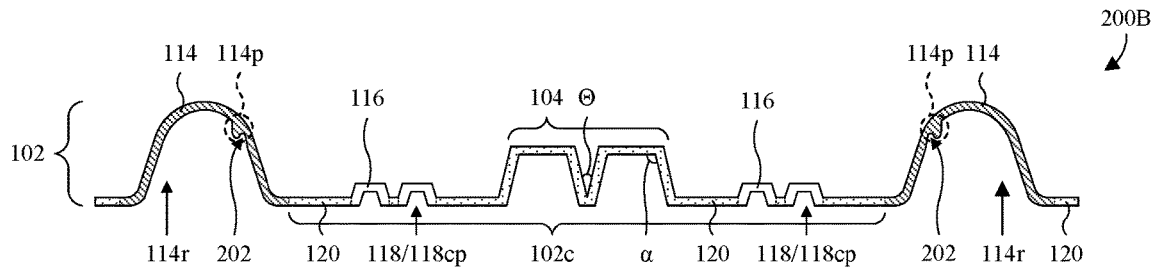

With reference to FIG. 2B, a cross-sectional view 200B of some second embodiments of the reusable vacuum bag 102 of FIG. 1 is provided. As illustrated, FIG. 2B is a variant of FIG. 2A in which sidewalls of the reusable vacuum bag 102 at the vacuum track 116 and the pattern 104 are angled. Angling sidewalls may, for example, increase the angle at which adjoining surfaces meet. For example, as illustrated by comparing FIG. 2A to FIG. 2B, an angle α at which two adjoining surfaces meet may increase beyond about 90 degrees due to the angling. The larger the angle at which two adjoining surfaces meet, the less stress where the two adjoining surfaces meet. As such, angling the sidewalls of the reusable vacuum bag 102 at the vacuum track 116 and the pattern 104 may, for example, reduce points of stress and increase the durability of the reusable vacuum bag 102.

If the separation between neighboring sidewalls is too small, angling the neighboring sidewalls may, for example, cause the neighboring sidewalls to meet at shallow angles. For example, as illustrated by comparing FIG. 2A to FIG. 2B, two neighboring sidewalls may meet at a shallow angle Θ due to the angling. A shallow angle may, for example, be an angle less than about 80, 60, or 30 degrees, and/or an angle between about 30-60, 40-80, or 50-85 degrees. The shallower the angle at which two adjoining surfaces meet, the more stress where the two adjoining surfaces meet. As such, angling sidewalls of the reusable vacuum bag 102 at the vacuum track 116 and the pattern 104 may, for example, also increase points of stress and reduce the durability of the reusable vacuum bag 102 in limited situations.

Figure 2C:
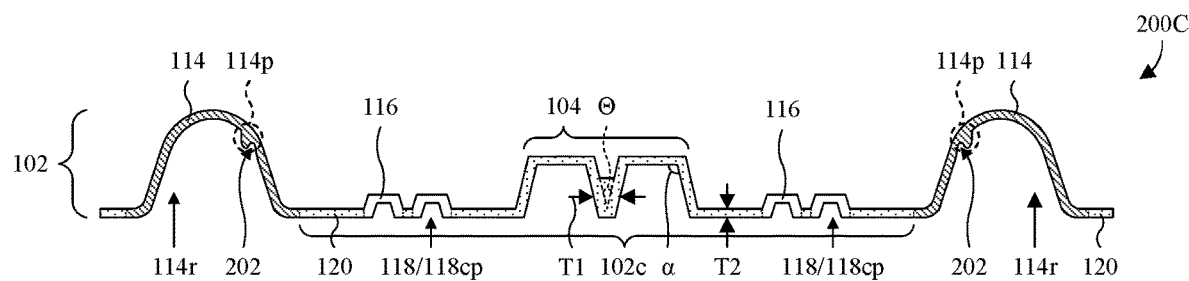

With reference to FIG. 2C, a cross-sectional view 200C of some third embodiments of the reusable vacuum bag 102 of FIG. 1 is provided. As illustrated, FIG. 2C is a variant of FIG. 2B in which a thickness of the reusable vacuum bag 102 is increased at points of stress and other points of failure. For example, the reusable vacuum bag 102 may have a first thickness T1 at points of stress and may have a second thickness T2 less than the first thickness T1 elsewhere. Points of stress may, for example, arise where adjoining surfaces meet at shallow angles. As above, a shallow angle may, for example, be an angle less than about 80, 60, or 30 degrees, and/or an angle between about 30-60, 40-80, or 50-85 degrees.

Figure 2D:
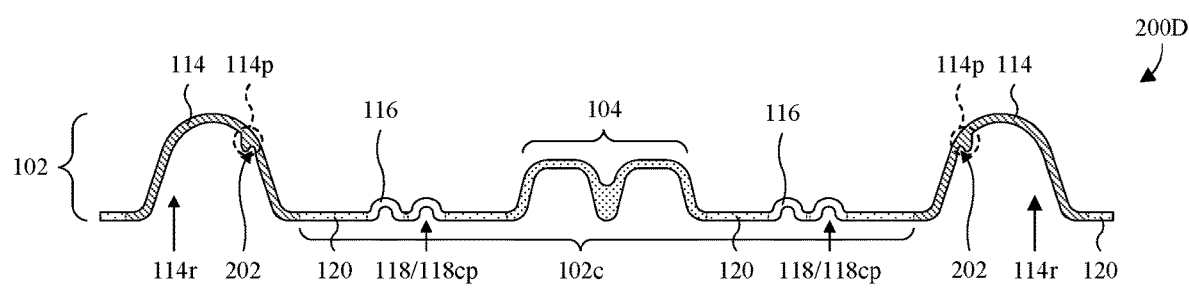

With reference to FIG. 2D, a cross-sectional view 200D of some fourth embodiments of the reusable vacuum bag 102 of FIG. 1 is provided. As illustrated, FIG. 2D is a variant of FIG. 2B in which edges of the reusable vacuum bag 102 are rounded at the pattern 104 and the vacuum track 116. Rounding edges of the reusable vacuum bag 102 reduces stress at the edges, thereby enhancing durability of the of the reusable vacuum bag 102.

Figures 3, 4:
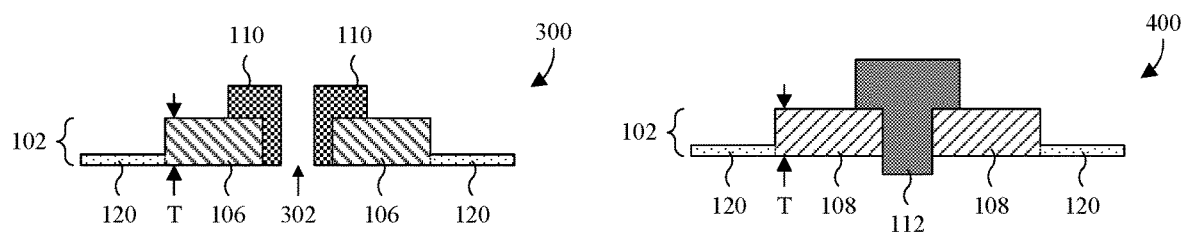
FIG. 3. illustrates a cross-sectional view of some embodiments of a vacuum port pad of the reusable vacuum bag of FIG. 1.
FIG. 4 illustrates a cross-sectional view of some embodiments of a sensor pad of the reusable vacuum bag of FIG. 1.

With reference to FIG. 3, a cross-sectional view 300 of some embodiments of the vacuum port pad 106 of FIG. 1 is provided. The cross-sectional view 300 may, for example, be taken along line B in FIG. 1. As illustrated, a thickness T of the reusable vacuum bag 102 is elevated at the vacuum port pad 106, relative to a remainder 120 of the reusable vacuum bag 102. Further, the vacuum port 110 extends through the vacuum port pad 106 and has a vacuum port channel 302 at a center of the vacuum port 110. The vacuum port channel 302 provides a path through which to create a vacuum in a cavity between the reusable vacuum bag 102 and a bottom plate (not shown).

FIG. 4 illustrates a cross-sectional view of some embodiments of a sensor pad of the reusable vacuum bag of FIG. 1. The cross-sectional view 400 may, for example, be taken along line C in FIG. 1. As illustrated, a thickness T of the reusable vacuum bag 102 is elevated at the sensor pad 108, relative to a remainder 120 of the reusable vacuum bag 102. Further, the sensor 112 is mounted to the sensor pad 108. In some embodiments, the sensor 112 extends through the sensor pad 108 to an underside of the sensor pad 108, which may, for example, be in a cavity during use of the reusable vacuum bag 102. The sensor 112 may, for example, be employed to measure pressure, temperature, or some other parameter of the cavity, and/or may be, for example, a thermocouple, some other type of temperature sensor, a pressure sensor, or some other type of sensor.

Figure 5:
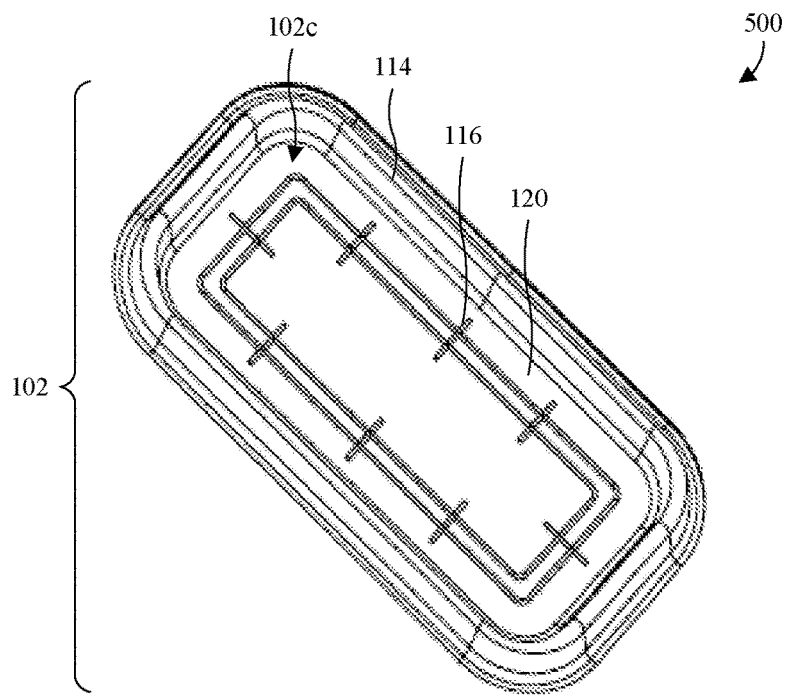
FIG. 5 illustrates a perspective view of some second embodiments of the reusable vacuum bag of FIG. 1.

With reference to FIG. 5, a perspective view 500 of some second embodiments of the reusable vacuum bag of FIG. 1 is provided. In contrast with FIG. 1, the pattern 104 of FIG. 1, the vacuum port pad 106 of FIG. 1, the vacuum port 110 of FIG. 1, the sensor pad 108 of FIG. 1, and the sensor 112 of FIG. 1 are omitted. Further, the vacuum track 116 has a different layout.

Figure 6A:
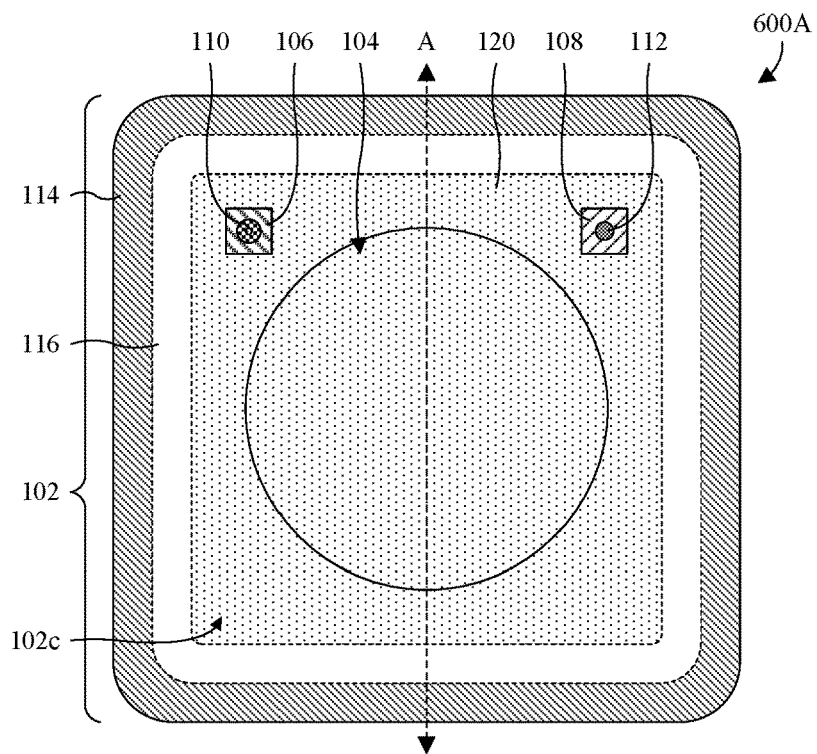
FIGS. 6A and 6B respectively illustrate top and bottom views of some third embodiments of a reusable vacuum bag of FIG. 1.
Figure 6B:
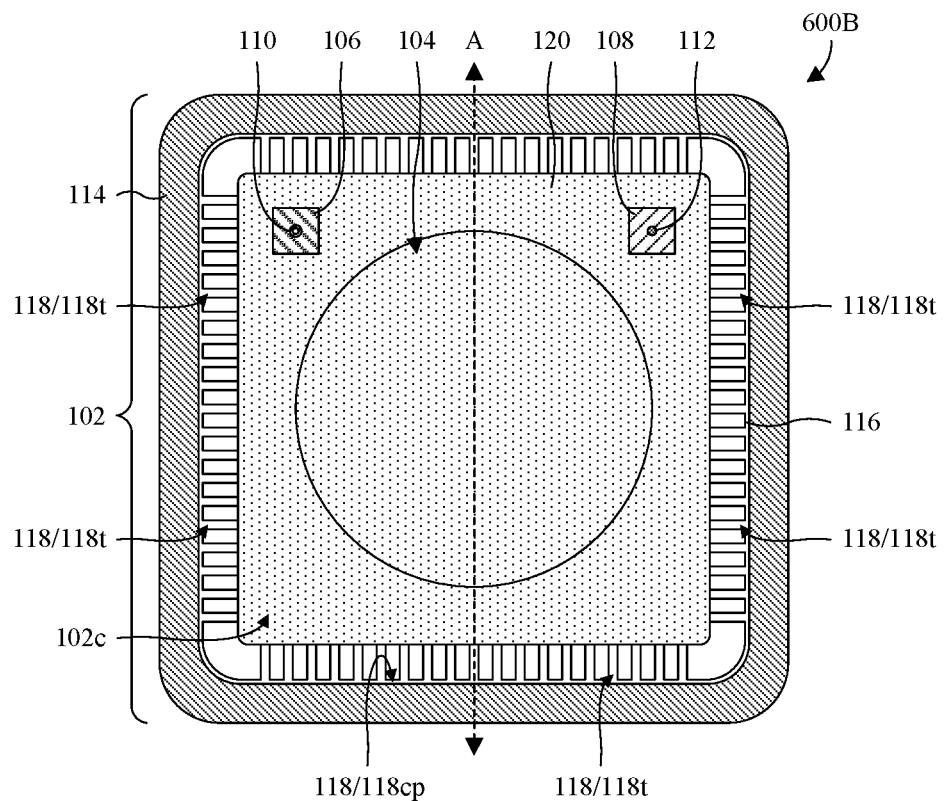

With reference to FIGS. 6A and 6B, a top view 600A and a bottom view 600B of some third embodiments of the reusable vacuum bag 102 of FIG. 1 are respectively provided. Solid lines may, for example, represent edges of the reusable vacuum bag 102 and/or contours of the reusable vacuum bag 102. The reusable vacuum bag 102 is as described with regard to FIG. 1, except that the reusable vacuum bag 102 has a different layout. For example, the pattern 104, the vacuum seal 114, and the vacuum track 116 may have different layouts, and the vacuum port pad 106 and the sensor pad 108 may have different locations.

The vacuum track 116 extends laterally in a closed path to surround and demarcate the central area 102c of the reusable vacuum bag 102. Further, the vacuum seal 114 borders the vacuum track 116 and extends laterally along a boundary of the vacuum track 116 to surround the vacuum track 116. In some embodiments, the vacuum track 116 and/or the vacuum seal 114 is/are each square ring shaped, rectangular ring shaped, circular ring shaped, or some other closed path shape. Further, in some embodiments, the vacuum track 116 and/or the vacuum seal 114 is/are each continuous and free of splices, seams, and other discontinuities.

With reference specifically to FIG. 6B, the vacuum track channels 118 comprise a closed-path vacuum track channel 118cp extending laterally along a boundary of the vacuum seal 114 in a closed path. The closed-path vacuum track channel 118cp may, for example, be rectangular ring shaped, triangular ring shaped, circular ring shaped, or some other closed path shape. Further, the vacuum track channels 118 comprise a plurality of transverse vacuum track channels 118t. For ease of illustration, only some of the transverse vacuum track channels 118t are labeled 118t. The transverse vacuum track channels 118t extend transverse to the closed-path vacuum track channel 118cp, laterally from the central area 102c of the reusable vacuum bag 102 to the closed-path vacuum track channel 118cp. Further, the transverse vacuum track channels 118t are 118 spaced along a boundary of the central area 102c. In some embodiments, the vacuum track channels 118 are arranged in a square ring shaped pattern, a rectangular ring shaped pattern, a circular ring shaped pattern, or some other ring shaped pattern.

During use of the reusable vacuum bag 102, a vacuum is formed between the reusable vacuum bag 102 and a bottom plate (not shown). The vacuum track channels 118 provide paths for the vacuum to reach the vacuum seal 114 and facilitate even distribution of the vacuum along the vacuum seal 114. For example, the transverse vacuum track channels 118t provide paths for the vacuum to reach the closed-path vacuum track channel 118cp, and the closed-path vacuum track channel 118cp provides a path for the vacuum to evenly distribute along the vacuum seal 114. As a result, a strong seal forms between the reusable vacuum bag 102 and the bottom plate.

In some embodiments, the transverse vacuum track channels 118t comprise multiple sets of transverse vacuum track channels. In some embodiments, each set of transverse vacuum track channels is on a different side of the central area 102c of the reusable vacuum bag 102, and/or each set of transverse vacuum track channels comprises multiple channels laterally elongated in parallel. In some embodiments, a first set of transverse vacuum track channels and a second set of transverse vacuum track channels are respectively on first opposite sides of the central area 102c of the reusable vacuum bag 102, and/or a third set of transverse vacuum track channels and a fourth set of transverse vacuum track channels are respectively on second opposite sides of the central area 102c. In some embodiments, transverse vacuum track channels from both the first and second sets are laterally elongated in parallel. Further, in some embodiments, transverse vacuum track channels from both the third and fourth sets are laterally elongated in parallel, and/or are laterally elongated in a direction transverse or perpendicular to the transverse vacuum track channels of the first and second sets.

While the reusable vacuum bag 102 is illustrated as including the pattern 104, the vacuum port pad 106, the sensor pad 108, the vacuum seal 114, and the vacuum track 116, any one of these features or a combination of these features may be omitted in other embodiments. Further, hashing of the vacuum port pad 106, hashing of the sensor pad 108, hashing of the vacuum seal 114, and hashing of the vacuum track 116 have been varied relative to each other and relative to a remainder 120 of the reusable vacuum bag 102 to emphasize these features. The variation in hashing is not to be construed as limiting the composition of the reusable vacuum bag 102. As noted above, the reusable vacuum bag 102 is a single, continuous piece of material free of seams and other discontinuities. Further yet, in some embodiments, the pattern 104, the vacuum port pad 106, the sensor pad 108, the vacuum seal 114, the vacuum track 116, or any combination of the foregoing features is/are integrated with the reusable vacuum bag 102, such that the feature(s) each correspond to an individual region of the reusable vacuum bag 102.

Figure 7A:
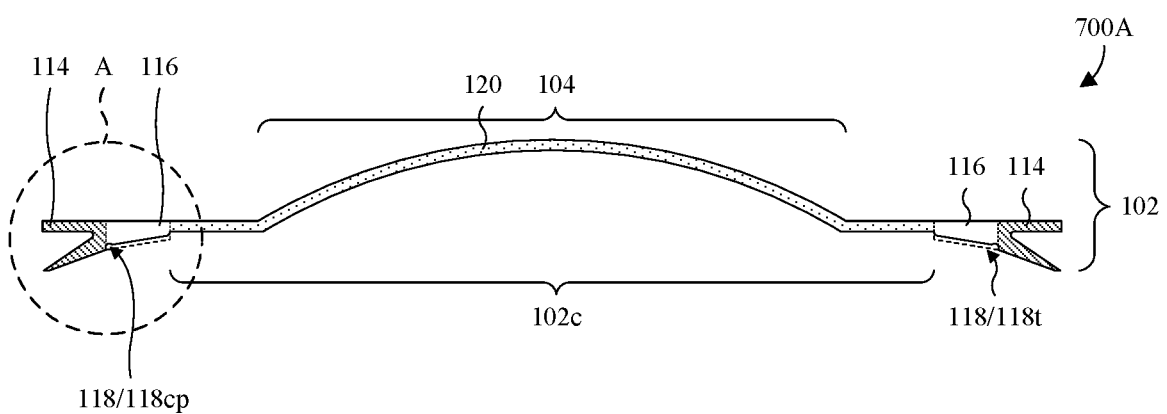
FIGS. 7A and 7B illustrate various cross-sectional views of some embodiments of the reusable vacuum bag of FIGS. 6A and 6B.
Figure 7B:
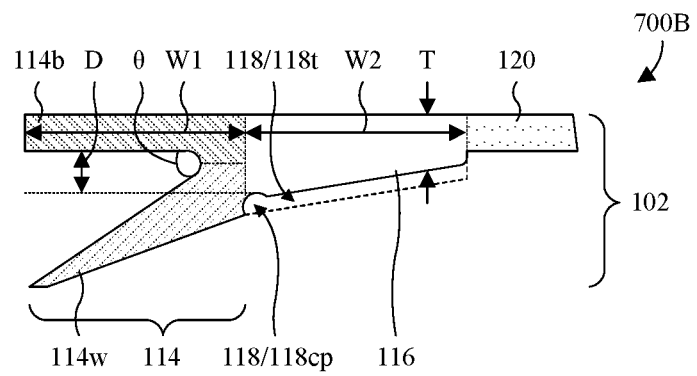

With reference to FIGS. 7A and 7B, various cross-sectional views 700A, 700B of some embodiments of the reusable vacuum bag 102 of FIGS. 6A and 6B are provided. The cross-sectional view 700A of FIG. 7A may, for example, be taken along line A in FIGS. 6A and 6B, and the cross-sectional view 700B of FIG. 7B may, for example, be an enlarged cross-sectional view taken within circle A in FIG. 7A. As illustrated, a transverse vacuum track channel 118t extends laterally from the closed-path vacuum track channel 118cp to the central area 102c of the reusable vacuum bag 102. In some embodiments, the transverse vacuum track channel 118t is slanted upward laterally from the closed-path vacuum track channel 118cp to the central area 102c of the reusable vacuum. In other embodiments, the transverse vacuum track channel 118t is horizontal. The transverse vacuum track channel 118t may, for example, be representative of each other transverse vacuum track channel 118t in FIG. 6B.

With reference specifically to FIG. 7B, the vacuum seal 114 comprises a seal base 114b and a seal wiper 114w. For illustrative purposes, hashing of the vacuum seal 114 has been varied between the seal base 114b and the seal wiper 114w. The variation in hashing is not be construed as limiting the composition of the vacuum seal 114, and it is to be understood that the vacuum seal 114 is continuous between the seal base 114b and the seal wiper 114w.

The seal base 114b overlies the seal wiper 114w and is oriented at an angle θ relative to the seal wiper 114w. The angle θ may, for example, be about 10-45 degrees, about 10-30 degrees, or about 30-45 degrees, and/or may, for example, be less than about 45, 35, or 25 degrees. In some embodiment, the seal base 114b is horizontal or substantially horizontal, whereas the seal wiper 114w is angled downward away from the vacuum track 116. During use the reusable vacuum bag 102, the seal wiper 114w deforms, such that the angle θ is about zero degrees. Further, the seal wiper 114w contacts an underlying bottom plate (not shown) continuously along a width W1 of the vacuum seal 114. This, in turn, leads to the formation of a strong seal between the reusable vacuum bag 102 and the bottom plate.

In some embodiments, the width W1 of the vacuum seal 114 is the same as or about the same as a width W2 of the vacuum track 116. In some embodiments, the closed-path vacuum track channel 118cp is recessed below the seal base 114b by a distance D. The width W1 of the vacuum seal 114 and/or the width W2 of the vacuum track 116 may, for example, be about 2-4, about 2.5-3.5, about 2.75-3.25, or about 3 times the distance D. In some embodiments, a thickness T of the reusable vacuum bag 102 increases along the vacuum track 116 towards the vacuum seal 114.

Figure 8:
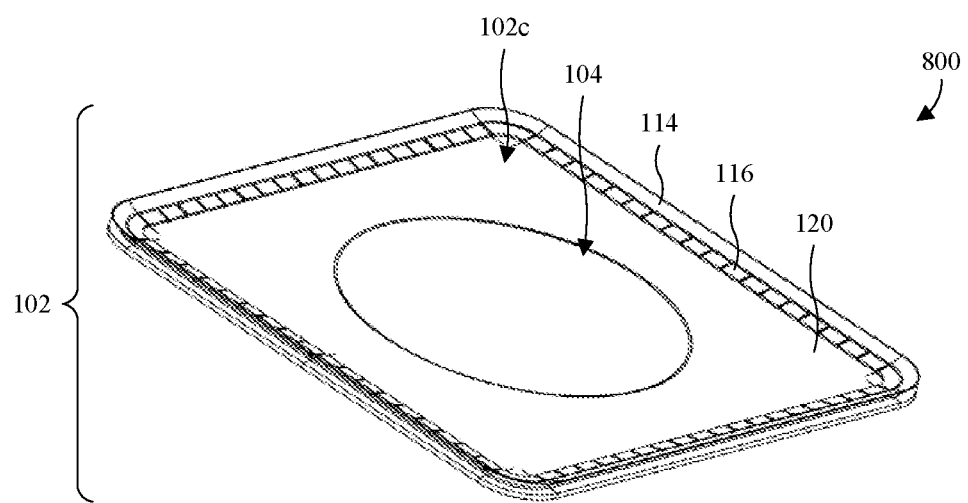
FIG. 8 illustrates a perspective view of some alternative embodiments of the reusable vacuum bag of FIGS. 6A and 6B.

With reference to FIG. 8, a perspective view 800 of some alternative embodiments of the reusable vacuum bag 102 of FIGS. 6A and 6B is provided. The perspective view 800 is such that a bottom of reusable vacuum bag 102 faces upward and a top of the reusable vacuum bag 102 faces downward. Further, in contrast with FIGS. 6A and 6B, the vacuum port pad 106 of FIGS. 6A and 6B, the vacuum port 110 of FIGS. 6A and 6B, the sensor pad 108 of FIGS. 6A and 6B, and the sensor 112 of FIGS. 6A and 6B are omitted.

Figure 9:
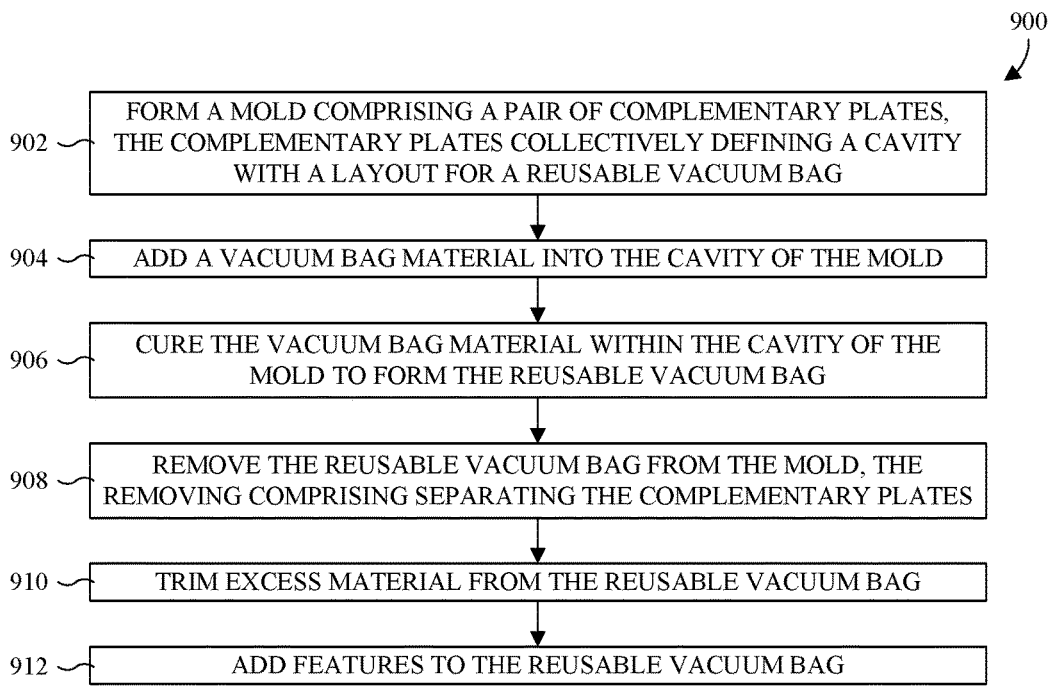
FIG. 9 illustrates a block diagram of some embodiments of a method for forming a reusable vacuum bag.

With reference to FIG. 9, a block diagram 900 of some embodiments of a method for forming a reusable vacuum bag is provided. The reusable vacuum bag may, for example, be the reusable vacuum bag 102 in any one of FIGS. 1, 2A-2D, 3-5, 6A, 6B, 7A, 7B, and 8. As seen hereafter, the method forms the reusable vacuum bag in a manner that depends on less human intervention, improves the reliability of the reusable vacuum bag, takes less time to produce, and lowers the overall cost.

At 902, a mold comprising a pair of complementary plates is formed. The complementary plates are complementary in that, when the complementary plates are adjoining, the complementary plates collectively define a cavity with a layout for a reusable vacuum bag being formed. The mold may, for example, be formed by computer-aided manufacturing (CAM), computer-aided design (CAD), computer numeric control (CNC) machining, or any combination of the foregoing. Further, the mold may, for example, be part of a casting tool, an injection molding tool, or some other tool for forming a cast from the mold.

At 904, a vacuum bag material is added into the cavity of the mold. The vacuum bag material may be, for example, silicone, a polymer, or curable material. Further, the vacuum bag material may, for example, be a liquid material or a solid, pliable material. In some embodiments in which the vacuum bag material is a liquid, the vacuum bag material may, for example, be poured into the mold. In some embodiments in which the vacuum bag material is a solid, pliable material or a liquid, the vacuum bag material may, for example, be injected into the mold under pressure. In some embodiments, the vacuum bag material is added into the cavity while the complementary plates adjoin and while the cavity is closed.

At 906, the vacuum bag material is cured or otherwise hardened within the mold to form the reusable vacuum bag. The vacuum bag material may, for example, be cured by heating, exposure to ultraviolet light, pressure, or any combination of the foregoing. In some embodiments, the mold and the vacuum bag material are heated in a heating chamber to cure the vacuum bag material. The heating chamber may, for example, be an oven or an autoclave. The heating may, for example, persist for at least about 10, 15, 30, or 60 minutes, and/or between about 10-30 minutes, about 30-60 minutes, or about 15-45 minutes. Further, the heating may, for example, be performed at about 275-325° F., about 250-350° F., or about 300° F.

In some embodiments, the reusable vacuum bag is formed with increased thickness at stress points and/or points of failure, relative to a remainder of the reusable vacuum bags. Such stress points and/or points of failure may include, for example, corners and/or regions of extreme curvature. Increasing the thickness at stress points and/or points of failure reinforces the reusable vacuum bag and prevents failures. Further, in some embodiments, an entirety of the reusable vacuum bag is formed at the same time, and/or is formed without seems and other discontinuities. This further strengthens the reusable vacuum bag and prevents failures.

In some embodiments, the reusable vacuum bag is formed with a vacuum port pad, a sensor pad, a vacuum seal (e.g., a T-seal) with or without splices, a vacuum track with or without tapered edges, some other vacuum bag features, or any combination of the foregoing. By forming these features integrated with the reusable vacuum bag, the cost of adhering and/or placing the features onto the reusable vacuum bag is negated. Further, the durability of the reusable vacuum bag is enhanced. The vacuum port and sensor pads may, for example, provide mounting locations respectively for a vacuum port and a sensor (e.g., a thermocouples or some other sensor). The vacuum seal may, for example, facilitate sealing of the reusable vacuum bag to a bottom plate, such that a vacuum may be formed between the reusable vacuum bag and the bottom plate during use of the reusable vacuum bag. The vacuum track may, for example, provide channels distributing the vacuum under the reusable vacuum bag, and/or allowing the vacuum to reach the vacuum seal, during use of the reusable vacuum bag.

At 908, the reusable vacuum bag is removed from the mold. The removing comprises separating the complementary plates to expose the reusable vacuum bag, and subsequently pulsing or pushing the reusable vacuum bag from the mold. In some embodiments, the reusable vacuum bag is cooled at room temperature between the curing at 906 and the removal at 908.

At 910, excess material is trimmed from the reusable vacuum bag. Such trimming may, for example, be performed with a knife or some other trimming tool. In some embodiments, the reusable vacuum bag is placed in an air circulating oven after the trimming or between the removal at 908 and the trimming at 910. The reusable vacuum bag may, for example, remain in the air circulating oven for at least about 2, 3, or 4 hours, and/or between about 90-150 minutes, about 60-240 minutes, or about 118-240 minutes. Further, the air circulating oven may, for example, heat the reusable vacuum bag at about 400-500° F., about 350-450° F., or about 400° F.

At 912, additional features are added to the reusable vacuum bag. The additional features may, for example, include a sensor, a vacuum port, some other suitable features, or any combination of the foregoing. For example, a thermocouple or some other sensor may be added to the reusable vacuum bag at the sensor pad integrated with the reusable vacuum bag. As another example, a vacuum port may be added to the reusable vacuum bag respectively at the vacuum port pad integrated with the reusable vacuum bag.

By forming the reusable vacuum bag according to the enhanced method, human intervention is reduced. The reduced human intervention, in turn, reduces costs, reduces the risk of human error, and improves intra-bag and inter-bag uniformity. For example, the reusable vacuum bag may have uniform or substantially uniform wall thicknesses. Further, by forming the reusable vacuum bag according to the enhanced method, the reusable vacuum bag may be free of seams and other discontinuities, and/or may have regions of increased wall thickness and/or rounded corners to reinforce stress points. The reduced human intervention, the lack of seams and other discontinuities, and the reinforced stress points lead to a durable vacuum seal bag with high elongation and high temperature resilience. As such, the vacuum seal bag has a long MTBF, even in the presence of elevated temperatures. The elevated temperatures may, for example, include temperatures greater than about 400, 500, or 600° F. Further, by forming the reusable vacuum bag according to the enhanced method, the reusable vacuum bag may be more quickly formed. For example, prior methods may take a week or more per reusable vacuum bag, whereas the enhanced method may take two days or less per reusable vacuum bag. Further, by forming the reusable vacuum bag according to the enhanced method, the reusable vacuum bags may have a seal, a vacuum track, and other features integrated with the reusable vacuum bags. This further enhances of the durability of the reusable vacuum bag.

While the block diagram 900 of FIG. 9 is illustrated and described herein as a series of acts or events, it will be appreciated that the illustrated ordering of such acts or events is not to be interpreted in a limiting sense. For example, some acts may occur in different orders and/or concurrently with other acts or events apart from those illustrated and/or described herein. Further, not all illustrated acts may be required to implement one or more aspects or embodiments of the description herein, and one or more of the acts depicted herein may be carried out in one or more separate acts and/or phases.

With reference to FIGS. 10A-10F, a series of cross-sectional views 1000A-1000F of some first embodiments of the method of FIG. 9 is provided in which injection molding is employed to form a reusable vacuum bag. The first embodiments of the method of FIG. 9 are illustrated by forming the reusable vacuum bag of FIG. 2D. However, any one of FIGS. 1, 2A-2C, 3-5, 6A, 6B, 7A, 7B, and 8 may be formed by the first embodiments of the method of FIG. 9.

Figure 10A:
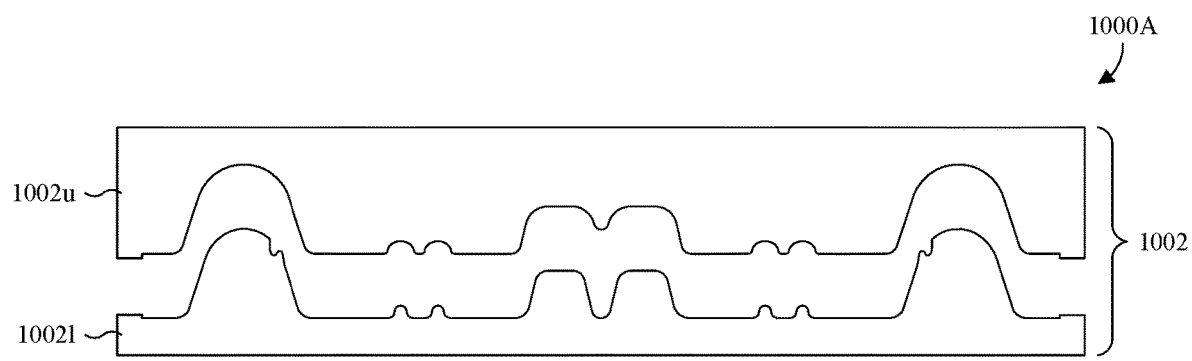
FIGS. 10A-10F illustrate a series of cross-sectional views of some first embodiments of the method of FIG. 9 using injection molding.

As illustrated by the cross-sectional view 1000A of FIG. 10A, a mold 1002 comprising a lower plate 1002*l* and an upper plate 1002*u* is formed. The lower and upper plates 1002*l*, 1002*u* are complementary, such that the lower and upper plates 1002*l*, 1002*u* define a cavity 1004 with a layout of the reusable vacuum bag being formed when pressed together. The lower plate 1002*l* has a pattern for an underside of the reusable vacuum bag being formed, and the upper plate 1002*u* has a pattern for an upper side of the reusable vacuum bag being formed. The mold 1002 may, for example, be formed as described at 902 of FIG. 9.

Figure 10B:
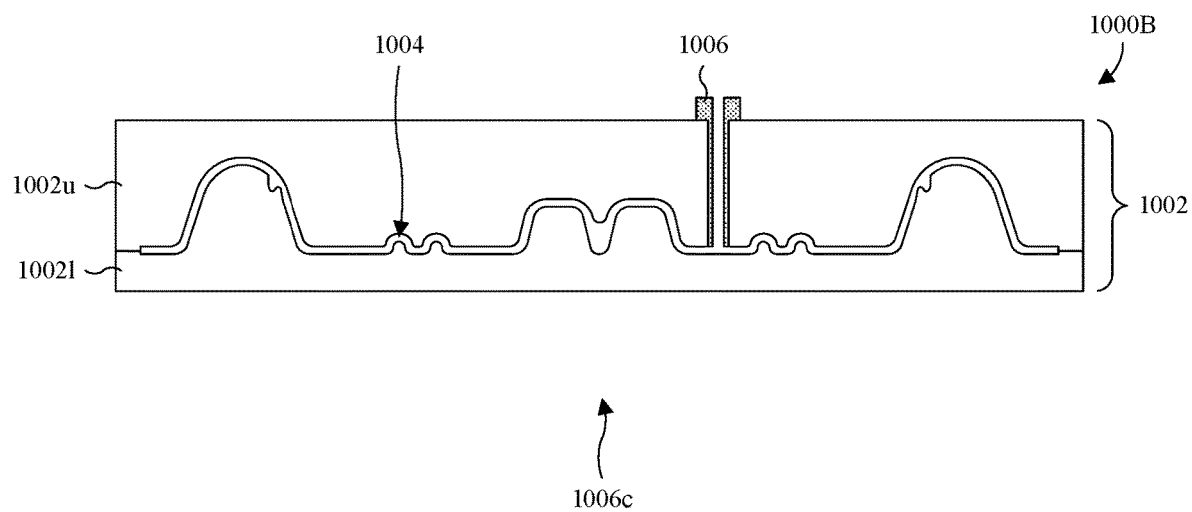

As illustrated by the cross-sectional view 1000B of FIG. 10B, the lower and upper plates 1002*l*, 1002*u* of the mold 1002 are pressed together to define a cavity 1004 with a layout of the reusable vacuum bag being formed. Further, a material port 1006 is added to the mold 1002 to enable vacuum bag material to be injected into the cavity 1004. In some embodiments, the material port 1006 is added to the upper plate 1002*u*. In other embodiments, the material port 1006 is added to the lower plate 1002*l*. The material port 1006 extends through the mold 1002 to the cavity 1004. Further, the material port 1006 has a central channel 1006*c* through which material may be added to the cavity 1004.

Figure 10C:
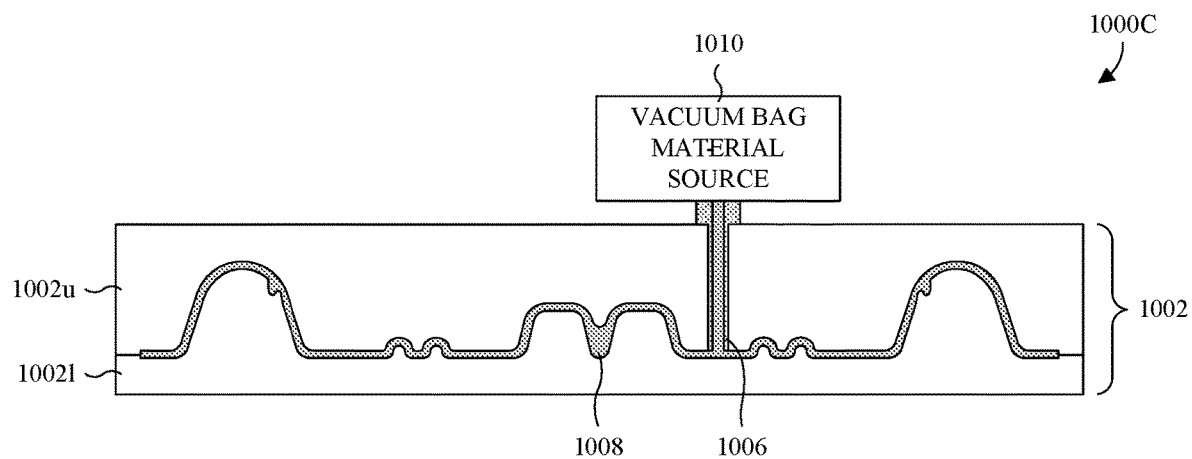

As illustrated by cross-sectional view 1000C of FIG. 10C, vacuum bag material 1008 is injected into to the cavity 1004 (see FIG. 10B) to fill the cavity 1004. In some embodiments, the vacuum bag material 1008 is injected into the cavity 1004 by a vacuum bag material source 1010 connected to the material port 1006. The vacuum bag material 1008 may, for example, be silicone, a polymer, or some other liquid and/or pliable material that is curable. In some embodiments, the vacuum bag material 1008 is injected into the cavity 1004 under pressure (e.g., at a pressure greater than an ambient pressure of the cavity 1004). In some embodiments, the pressure at which the vacuum bag material 1008 is injected into the cavity 1004 is greater than about 20, 50, 100, or 200 pounds per square inch (PSI), and/or is between about 20-200 PSI, about 20-100 PSI, about 50-100 PSI, or about 100-200 PSI.

Figure 10D:
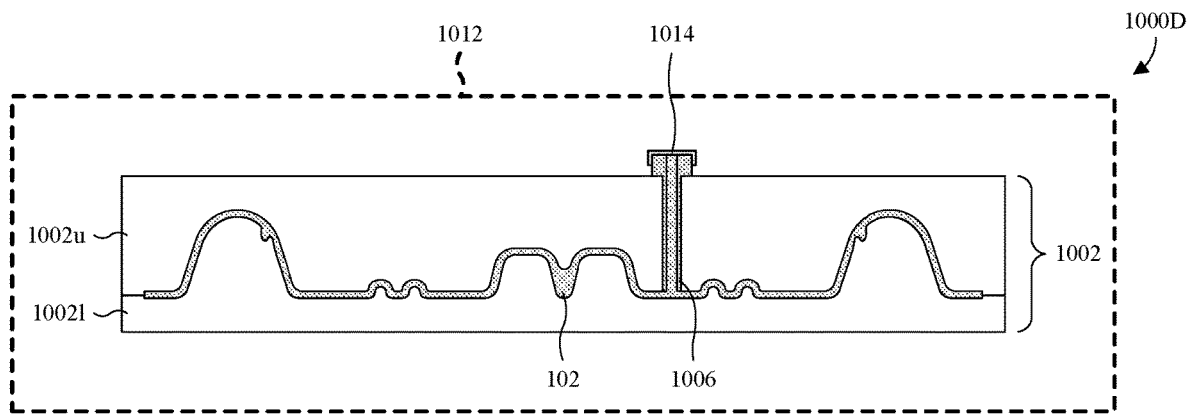

As illustrated by the cross-sectional view 1000D of FIG. 10D, the vacuum bag material 1008 (see FIG. 10C) is cured in a heating chamber 1012 to form a reusable vacuum bag 102. In some embodiments, the heating chamber 1012 is an autoclave. In other embodiments, the heating chamber 1012 is an oven. The vacuum bag material 1008 may, for example, be cured as described at 906 of FIG. 9. In some embodiments, a cap 1014 is secured to the material port 1006 during the curing.

Figure 10E:
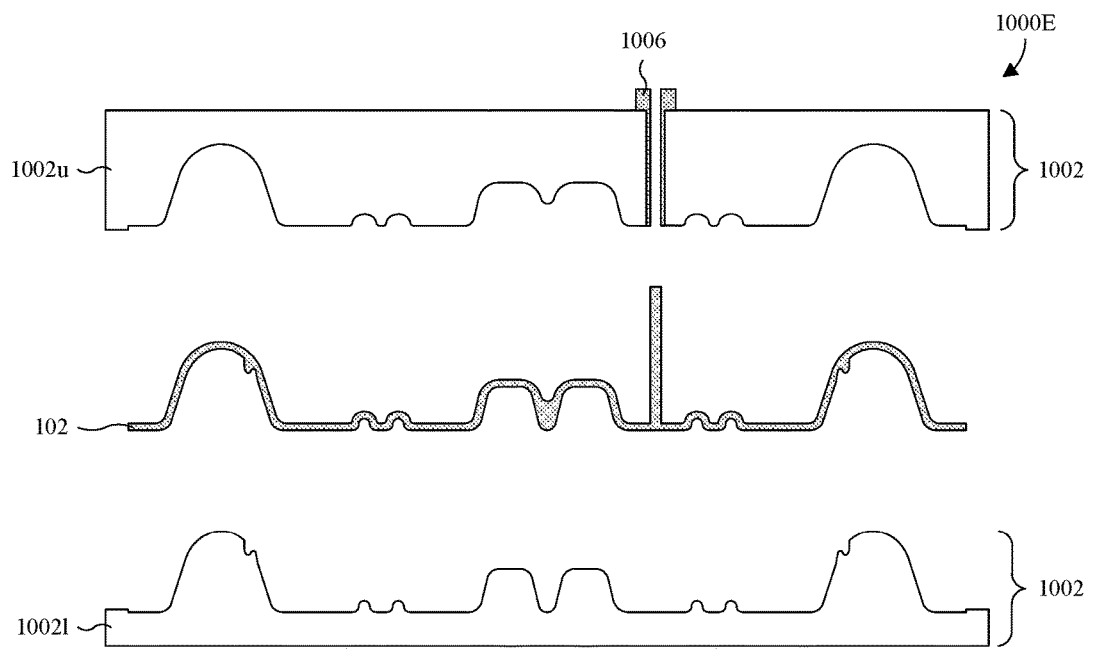

As illustrated by the cross-sectional view 1000E of FIG. 10E, the reusable vacuum bag 102 is removed from the mold 1002. In some embodiments, a process for performing the removing comprises separating the lower and upper plates 1002*l*, 1002*u* of the mold 1002 to expose the reusable vacuum bag 102, and subsequently pulling or pushing the reusable vacuum bag 102 off the lower and upper plates 1002*l*, 1002*u*. In some embodiments, the process further comprises removing the cap 1014 (see FIG. 10D) from the material port 1006 before separating the lower and upper plates 1002*l*, 1002*u*.

Figure 10F:
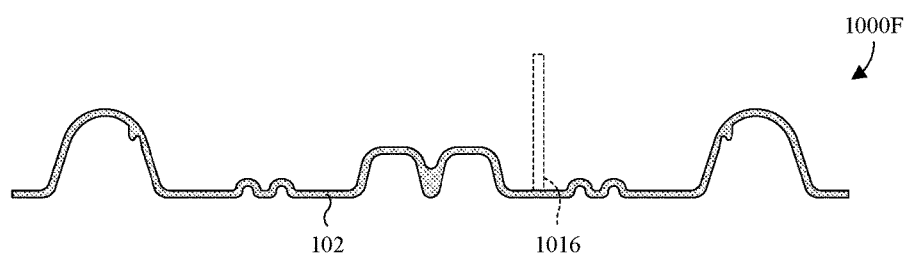

As illustrated by the cross-sectional view 1000F of FIG. 10F, excess material 1016 is trimmed from the reusable vacuum bag 102. The excess material 1016 may, for example, be trimmed from the reusable vacuum bag 102 by a knife or some other cutting tool. In some embodiments, additional features are also added to the reusable vacuum bag 102. For example, a sensor (e.g., a thermocouple), a vacuum port, some other suitable features, or any combination of the foregoing may be added to the reusable vacuum bag 102.

With reference to FIGS. 11A-11F, a series of cross-sectional views 1100A-1100F of some second embodiments of the method of FIG. 9 is provided in which casting is employed to form a reusable vacuum bag. The second embodiments of the method of FIG. 9 are illustrated by forming the reusable vacuum bag of FIG. 2D. However, any one of FIGS. 1, 2A-2C, 3-5, 6A, 6B, 7A, 7B, and 8 may be formed by the second embodiments of the method of FIG. 9.

Figure 11A:
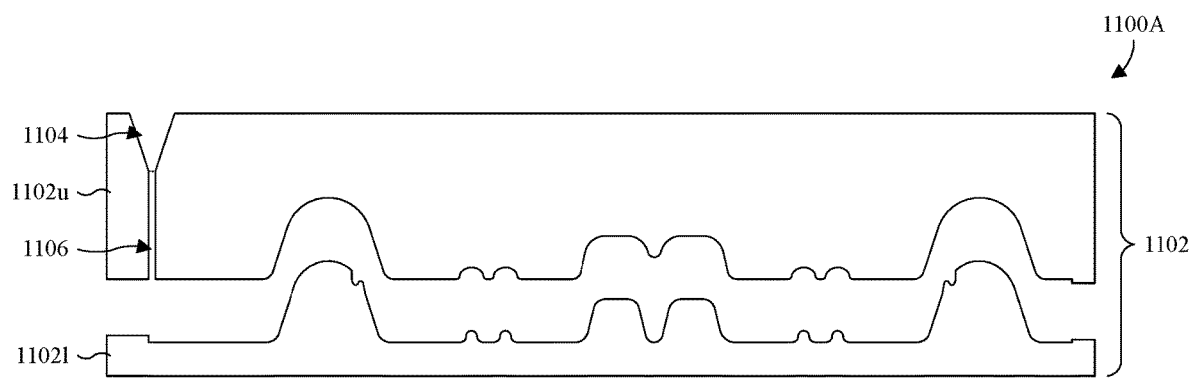
FIGS. 11A-11F illustrate a series of cross-sectional views of some second embodiments of the method of FIG. 9 using casting.

As illustrated by the cross-sectional view 1100A of FIG. 11A, a mold 1102 comprising a lower plate 1102*l* and an upper plate 1102*u* is formed. The lower and upper plates 1102*l*, 1102*u* are complementary and collectively define a cavity with a layout of the reusable vacuum bag being formed when pressed together. Further, the upper plate 1102*u* defines a pouring cup 1104 and at least part of a channel 1106. When the lower and upper plates 1102*l*, 1102*u* are pressed together, the channel 1106 leads from the pouring cup 1104 to the cavity. In some embodiments, the upper plate 1102*u* wholly defines the channel 1106. In other embodiments, the upper and lower plates 1102*u*, 1102*l* collectively define the channel 1106. The mold 1002 may, for example, be formed as described at 902 of FIG. 9.

Figure 11B:
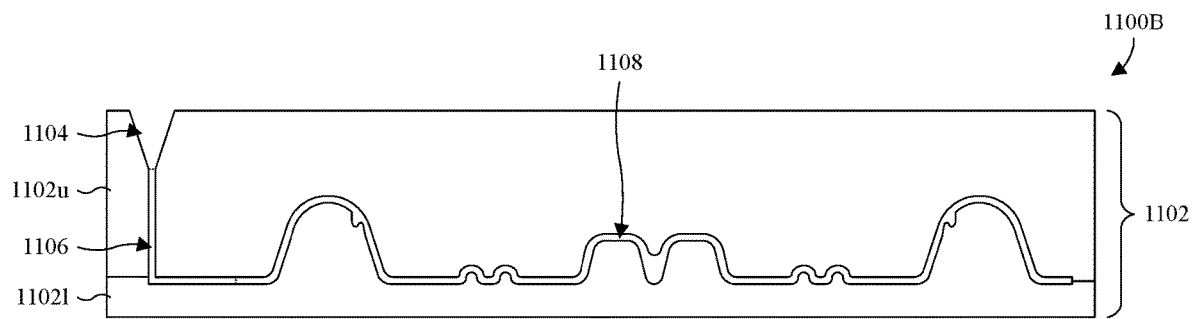

As illustrated by the cross-sectional view 1100B of FIG. 11B, the lower and upper plates 1102*l*, 1102*u* of the mold 1102 are pressed together to define a cavity 1108 with a layout of the reusable vacuum bag being formed.

Figure 11C:
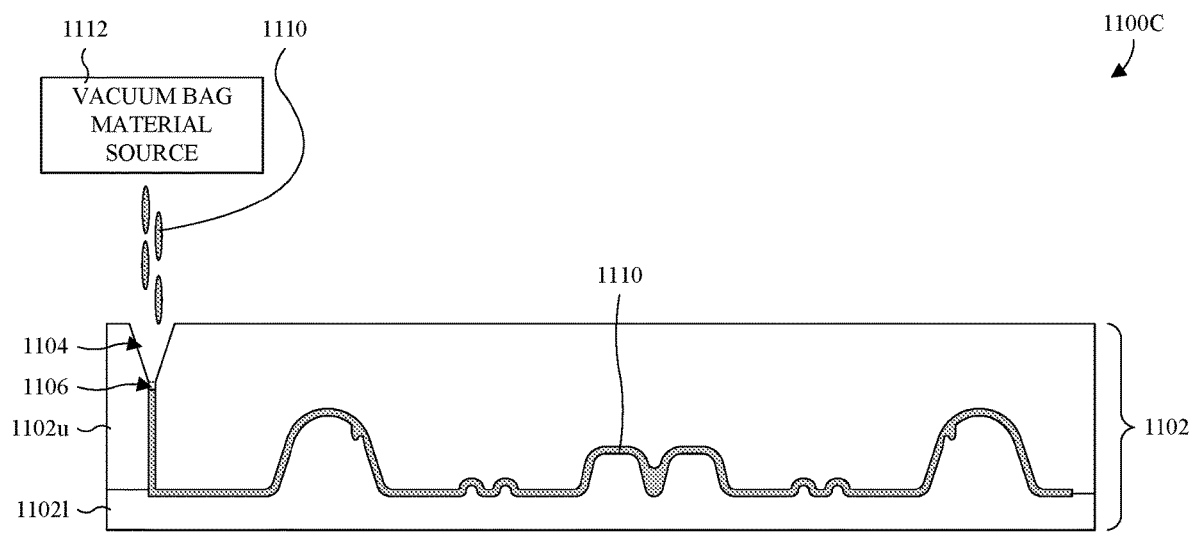
Figure 11D:
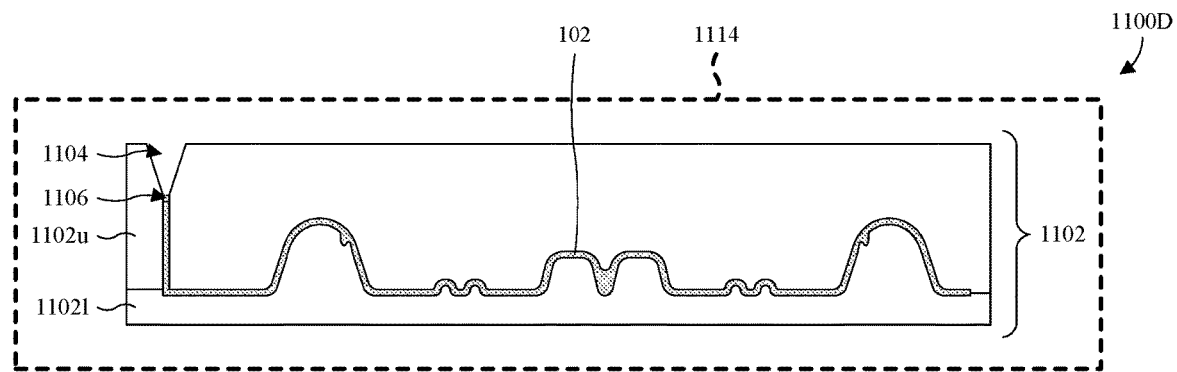

As illustrated by the cross-sectional view 1100C of FIG. 11C, vacuum bag material 1110 from a vacuum bag material source 1112 is poured into to the cavity 1108 (see FIG. 11B) through the pouring cup 1104 and the channel 1106, thereby filling the cavity 1108. The vacuum bag material 1110 is a curable liquid and may, for example, be silicone or some other liquid material that is suitable for use with the reusable vacuum bag being formed.

As illustrated by the cross-sectional view 1000D of FIG. 10D, the vacuum bag material 1110 (see FIG. 11C) is cured in a heating chamber 1114 to form a reusable vacuum bag 102. In some embodiments, the heating chamber 1114 is an autoclave. In other embodiments, the heating chamber 1114 is an oven. The vacuum bag material 1110 may, for example, be cured as described at 906 of FIG. 9.

Figure 11E:
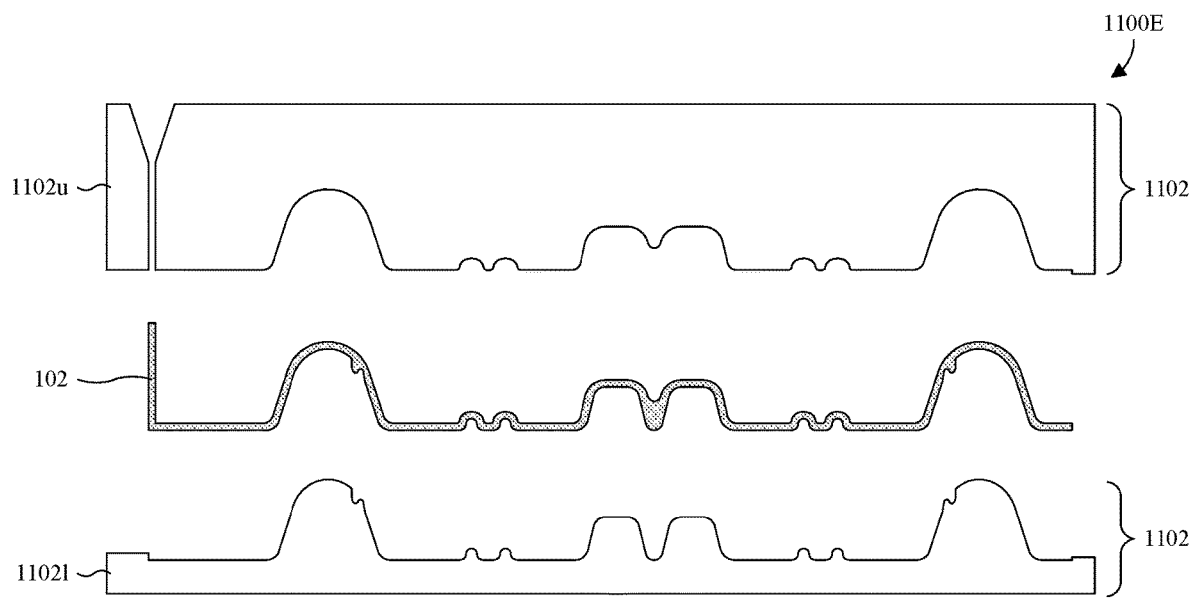

As illustrated by the cross-sectional view 1100E of FIG. 11E, the reusable vacuum bag 102 is removed from the mold 1102. In some embodiments, a process for performing the removing comprises separating the lower and upper plates 1102*l*, 1102*u* of the mold 1102 to expose the reusable vacuum bag 102, and subsequently pulling or pushing the reusable vacuum bag 102 off the lower and upper plates 1102*l*, 1102*u*.

Figure 11F:
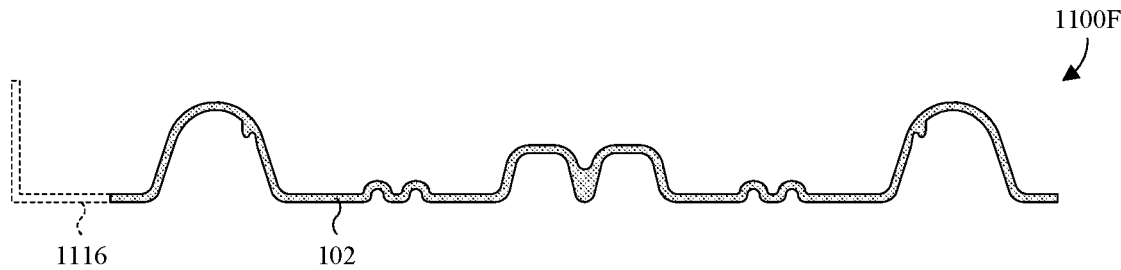

As illustrated by the cross-sectional view 1100F of FIG. 11F, excess material 1116 is trimmed from the reusable vacuum bag 102. The excess material 1116 may, for example, be trimmed from the reusable vacuum bag 102 by a knife or some other cutting tool. Further, in some embodiments, additional features are added to the reusable vacuum bag.

Figure 12:
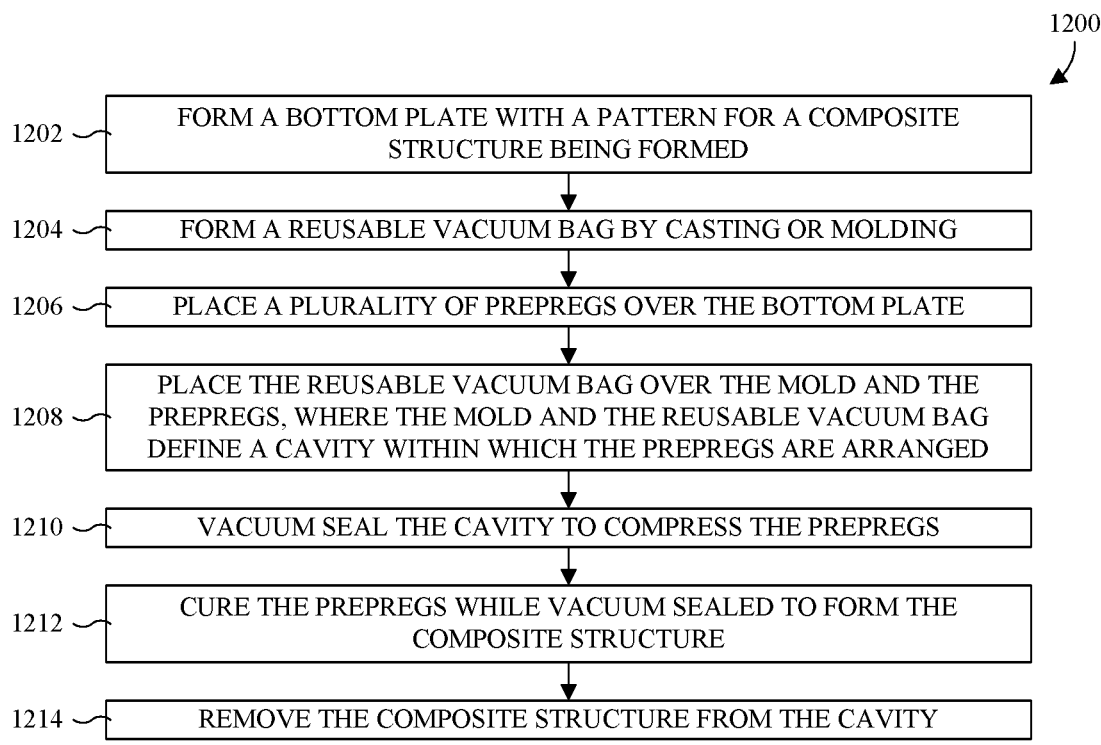
FIG. 12 illustrates a block diagram of some embodiments of a method for forming a composite structure using a reusable vacuum bag.

With reference to FIG. 12, a block diagram 1200 of some embodiments of a method for forming a composite structure using a reusable vacuum bag is provided. The reusable vacuum bag may, for example, be the reusable vacuum bag 102 in any one of FIGS. 1, 2A-2D, 3-5, 6A, 6B, 7A, 7B, and 8.

At 1202, a bottom plate is formed, such that an upper side of the bottom plate has a pattern for the composite structure being formed. The bottom plate may, for example, be formed by CAM, CAD, CNC machining, or any combination of the foregoing.

At 1204, a reusable vacuum bag is formed by casting or molding. As such, the reusable vacuum bag is a single, continuous piece of material free of seams and other discontinuities. Further, the reusable vacuum bag has high wall thickness uniformity. The reusable vacuum bag may, for example, be formed by the method according any one of: FIG. 9; FIGS. 10A-10F; and FIGS. 11A-11F. In some embodiments, a lower side of the reusable vacuum pad has a pattern for the composite structure being formed. Further, in some embodiments, the layout of the reusable vacuum is complementary to a layout of the bottom plate.

At 1206, a plurality of prepregs are stacked over the bottom plate. A prepreg may, for example, be a layer of fibers embedded within or impregnated with a polymer or resin. The polymer or resin may, for example, be or comprise epoxy, a thermoset polymer or resin, or some other suitable polymer or resin.

At 1208, the reusable vacuum bag is placed over the bottom plate and the prepregs to define a cavity within which the prepregs are arranged.

At 1210, the cavity is vacuum sealed to compress the prepregs.

At 1212, the prepregs are cured while vacuum sealed to form the composite structure. The prepregs may, for example, be cured by heating, exposure to ultraviolet light, pressure, some other curing process, or any combination of the foregoing. In some embodiments, the bottom plate, the reusable vacuum bag, and the prepregs are placed in an autoclave, an oven, or some other heating chamber to cure the prepregs. In some embodiments, the curing is performed at temperatures greater than about 200, 300, or 400° F., and/or temperatures between about 300-400° F., about 200-300° F., or about 300-400° F.

Because reusable vacuum bag 102 is free of seams and other discontinuities, the reusable vacuum bag is not subject to weakness introduced by seams and other discontinuities. Further, because of the high wall thickness uniformity of the reusable vacuum bag, the reusable vacuum bag uniformly absorbs heat. Collectively, the lack of discontinuities and uniform wall thickness lead to high heat resiliency and high durability.

While the block diagram 1200 of FIG. 12 is illustrated and described herein as a series of acts or events, it will be appreciated that the illustrated ordering of such acts or events is not to be interpreted in a limiting sense. For example, some acts may occur in different orders and/or concurrently with other acts or events apart from those illustrated and/or described herein. Further, not all illustrated acts may be required to implement one or more aspects or embodiments of the description herein, and one or more of the acts depicted herein may be carried out in one or more separate acts and/or phases.

Further, while the method of FIG. 12 is focused on forming a composite structure using a reusable vacuum bag, the method may be modified for use in bonding operations; pre-forms; debulking; PMC; CMC; or any combination of the foregoing. For example, to use the method for bonding operations, two layers to be bonded together may be used in place of the prepregs, and the curing at 1212 may be used to cure an adhesive between the two layers.

With reference to FIGS. 13A-13E, a series of cross-sectional views 1300A-1300E of some first embodiments of the method of FIG. 12 is provided. As illustrated by the cross-sectional view 1300A of FIG. 13A, a bottom plate 1302 and a reusable vacuum bag 102 are formed. The bottom plate 1302 may, for example, be formed as described at 1202 of FIG. 12. The reusable vacuum bag 102 may, for example, be formed as described as 1204 of FIG. 12.

The bottom plate 1302 is formed with an upward protrusion 1304, and the reusable vacuum bag 102 is formed with a vacuum seal 114 complementary to the upward protrusion 1304. The upward protrusion 1304 has a pair of upward protrusion segments respectively on opposite sides of the bottom plate 1302, and the vacuum seal 114 has a pair of vacuum seal segments respectively on the opposite sides. The vacuum seal segments are configured to receive the upward protrusion segments, respectively, at a seal recess 114r. In some embodiments, the upward protrusion 1304, the vacuum seal 114, and the seal recess 114r have ring-shaped top layouts or some other closed-path top layouts.

In some embodiments, the bottom plate 1302 is further formed with a bottom plate pattern 1306. In some embodiments, bottom plate pattern 1306 is completely surrounded by the upward protrusion 1304 when viewed top down. In some embodiments, the reusable vacuum bag 102 is further formed with a vacuum bag pattern 104, a vacuum track 116 defining vacuum track channels 118, a seal protrusion 114p, a seal channel 202, or any combination (e.g., all) of the foregoing in the seal recess 114r. In some embodiments, the vacuum bag pattern 104, the vacuum track 116, the seal protrusion 114p, the seal channel 202, or any combination (e.g., all) of the foregoing is/are completely surrounded by the vacuum seal 114 when viewed top down. In some embodiments, a top layout of the vacuum track 116 and/or a top layout of the vacuum seal 114 is/are as shown in FIG. 1.

Note that hashing of the bottom plate 1302 has been varied relative to a remainder 1308 of the reusable vacuum bag 102 to emphasize the bottom plate 1302. It is to be understood that the variation in hashing is not to be construed as limiting the composition of the bottom plate 1302. Similarly, note that hashing of the vacuum seal 114, and hashing of the vacuum track 116 have been varied relative to each other and relative to a remainder 120 of the reusable vacuum bag 102 to emphasize these features. It is to be understood that the variation in hashing is not to be construed as limiting the composition of the reusable vacuum bag 102. The reusable vacuum bag 102 is a single, continuous piece of material free of seams and other discontinuities.

Figure 13A:
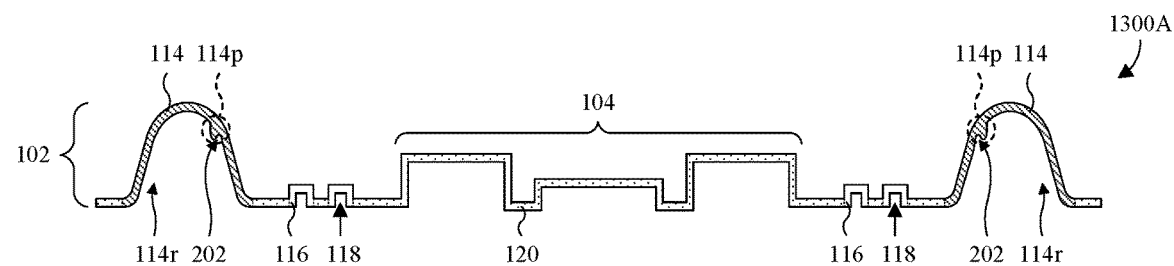
FIGS. 13A-13E illustrate a series of cross-sectional views of some first embodiments of the method of FIG. 12.
Figure 13A:
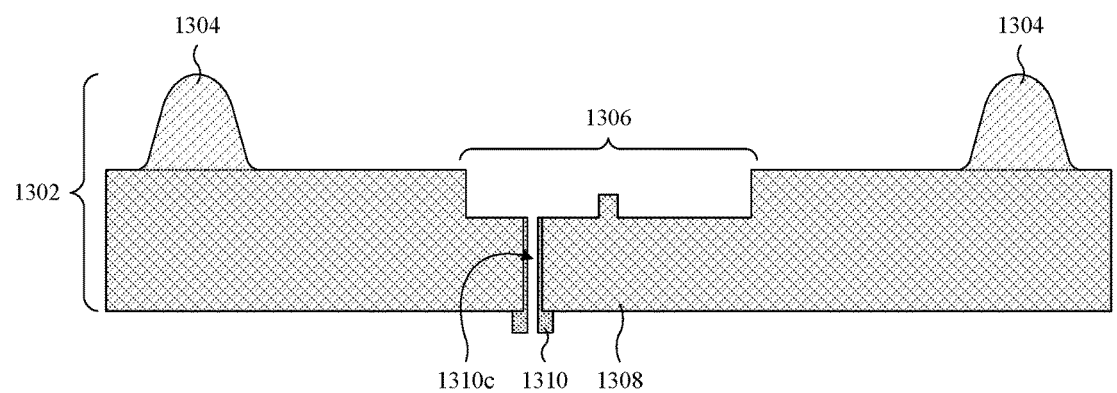

Also illustrated by the cross-sectional view 1300A of FIG. 13A, in some embodiments, a vacuum port 1310 is added to the bottom plate 1302. The vacuum port 1310 extends through the bottom plate 1302 and has a central channel 1310c through which to create a vacuum between the bottom plate 1302 and the reusable vacuum bag 102.

Figure 13B:
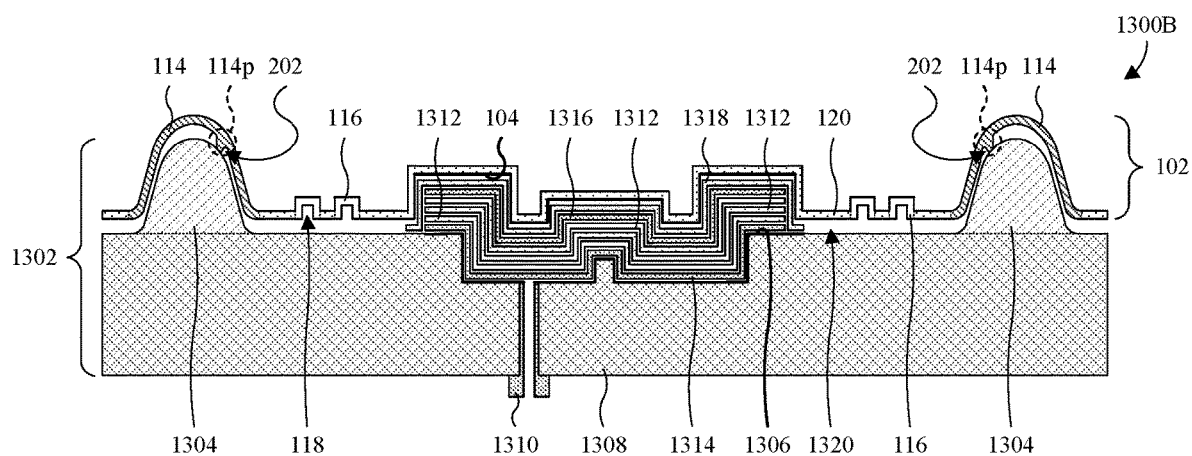

As illustrated by the cross-sectional view 1300B of FIG. 13B, a plurality of prepregs 1312 are stacked over the bottom plate 1302. In embodiments in which the bottom plate pattern 1306 is present, the prepregs 1312 are stacked on the bottom plate pattern 1306. In some embodiments, a lower release sheet 1314 is placed on the bottom plate 1302 and the prepregs 1312 are stacked over the lower release sheet 1314. In some embodiments, an upper release sheet 1316 and/or a breather sheet 1318 are stacked over the prepregs 1312. In some embodiments, the lower release sheet 1314 and/or the upper release sheet 1316 is/are non-porous.

Also illustrated by the cross-sectional view 1300B of FIG. 13B, the reusable vacuum bag 102 is placed over the bottom plate 1302, such that the reusable vacuum bag 102 covers the prepregs 1312 and the vacuum seal 114 mates with the upward protrusion 1304. In embodiments in which the vacuum bag pattern 104 is present, the reusable vacuum bag 102 is also placed over the bottom plate 1302, such that the vacuum bag pattern 104 overlies the prepregs 1312. The mating between the vacuum seal 114 and the upward protrusion 1304 defines a cavity 1320 between the reusable vacuum bag 102 and the bottom plate 1302, and within which the prepregs 1312 are arranged. In embodiments in which the seal protrusion 114p is present, the seal protrusion 114p protrudes towards the upward protrusion 1304 to promote good contact between the vacuum seal 114 and the upward protrusion 1304. This, in turn, promotes strong sealing between the reusable vacuum bag 102 and the bottom plate 1302.

Figure 13C:
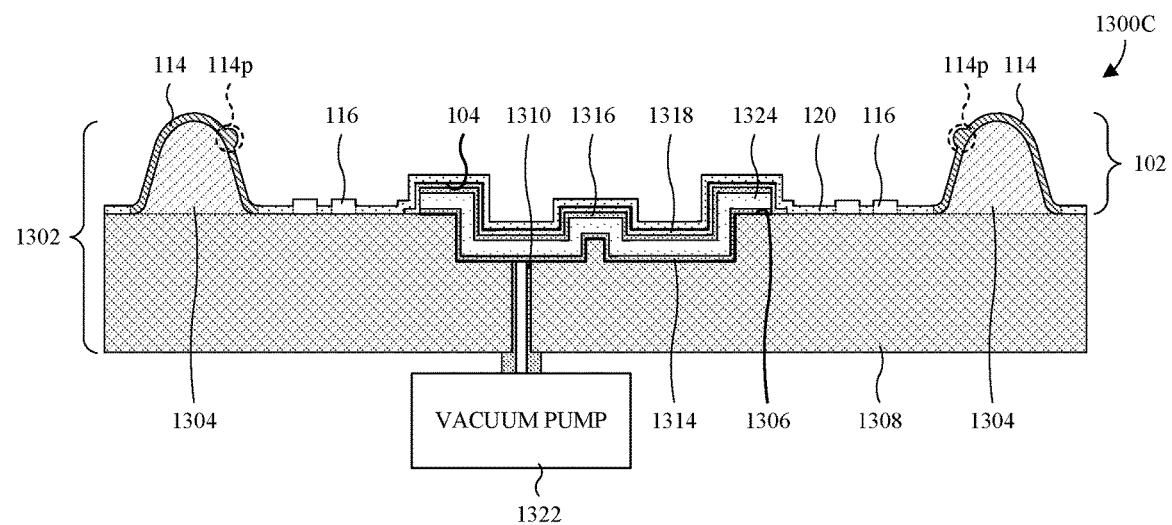

As illustrated by the cross-sectional view 1300C of FIG. 13C, the cavity 1320 (see FIG. 13B) is vacuumed. In some embodiments, the vacuuming is performed by a vacuum pump 1322 connected to the vacuum port 1310. The vacuuming causes a pressure differential between the cavity 1320 and an ambient environment of the cavity 1320, whereby the ambient environment presses the reusable vacuum bag 102 against the bottom plate 1302 and the prepregs 1312 to compress the prepregs 1312 (see FIG. 13B) into a common prepreg 1324. Further, the reusable vacuum bag 102 deforms to the bottom plate 1302 and the common prepreg 1324. Due to the deformation, the seal channel 202 (see FIG. 13B) and/or the vacuum track channels 118 (see FIG. 13B) may, for example, collapse. In embodiments in which the vacuum bag pattern 104 and/or the bottom plate pattern 1306 is/are present, the vacuuming transfers the vacuum bag pattern 104 and/or the bottom plate pattern 1306 to the common prepreg 1324.

During the vacuuming, the seal channel 202 provides a path for the vacuum to evenly distribute along the vacuum seal 114, and the vacuum track channels 118 provide paths for the vacuum to reach the seal channel 202. This, in turn, prevents the vacuum between the vacuum seal 114 and the bottom plate from failing. Further, the vacuum track channels 118 provide paths for the vacuum to evenly distribute throughout the cavity 1320 so pockets of air and other gases do not develop during the vacuuming. In some embodiments, the reusable vacuum bag 102 has increased rigidity at the seal channel 202 and/or the vacuum track channels 118 so the seal channel 202 and/or the vacuum track channels 118 persist completely through the vacuuming or persist mostly through the vacuuming. Such increased rigidity may, for example, be due sidewalls and/or to increased wall thickness.

Figure 13D:
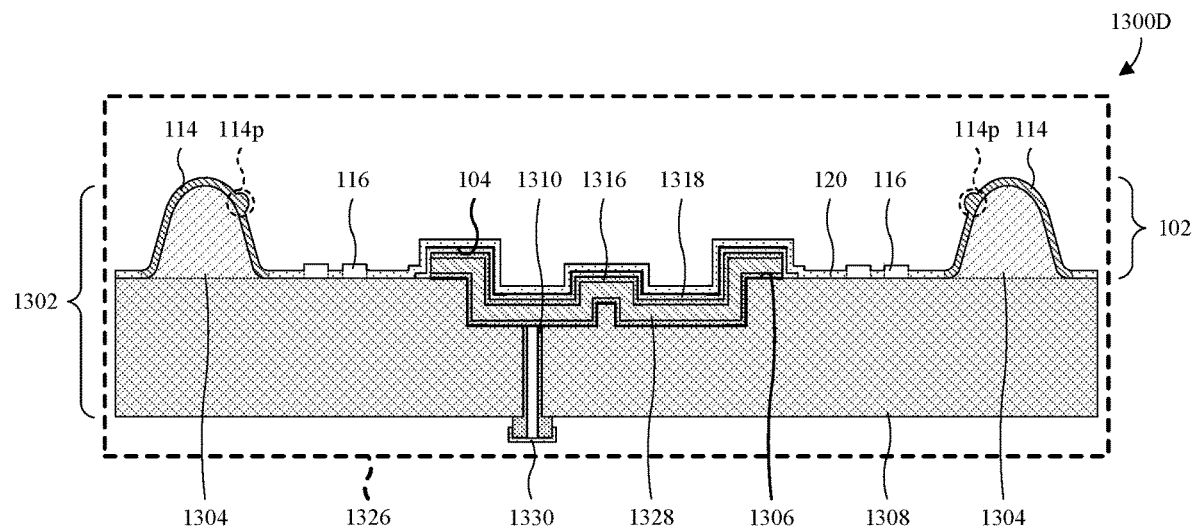

As illustrated by the cross-sectional view 1300D of FIG. 13D, the common prepreg 1324 (see FIG. 13C) is cured in a heating chamber 1326 to form a composite structure 1328. The heating chamber 1326 may, for example, be an autoclave, an oven, or some other heating chamber. In some embodiments, the common prepreg 1324 is cured in the heating chamber 1326 at temperatures greater than about 200, 300, or 400° F., and/or at temperatures between about 300-400° F., about 200-300° F., or about 300-400° F. In some embodiments (e.g., where the heating chamber 1326 is an autoclave), the common prepreg 1324 is further compressed at pressures greater than about 50, 90, 100, or 200 PSI, and/or pressures between about 50-100 PSI, about 100-200 PSI, or about 75-125 PSI, during the curing. In some embodiments, a cap 1330 is secured to the vacuum port 1310 during the curing.

Figure 13E:
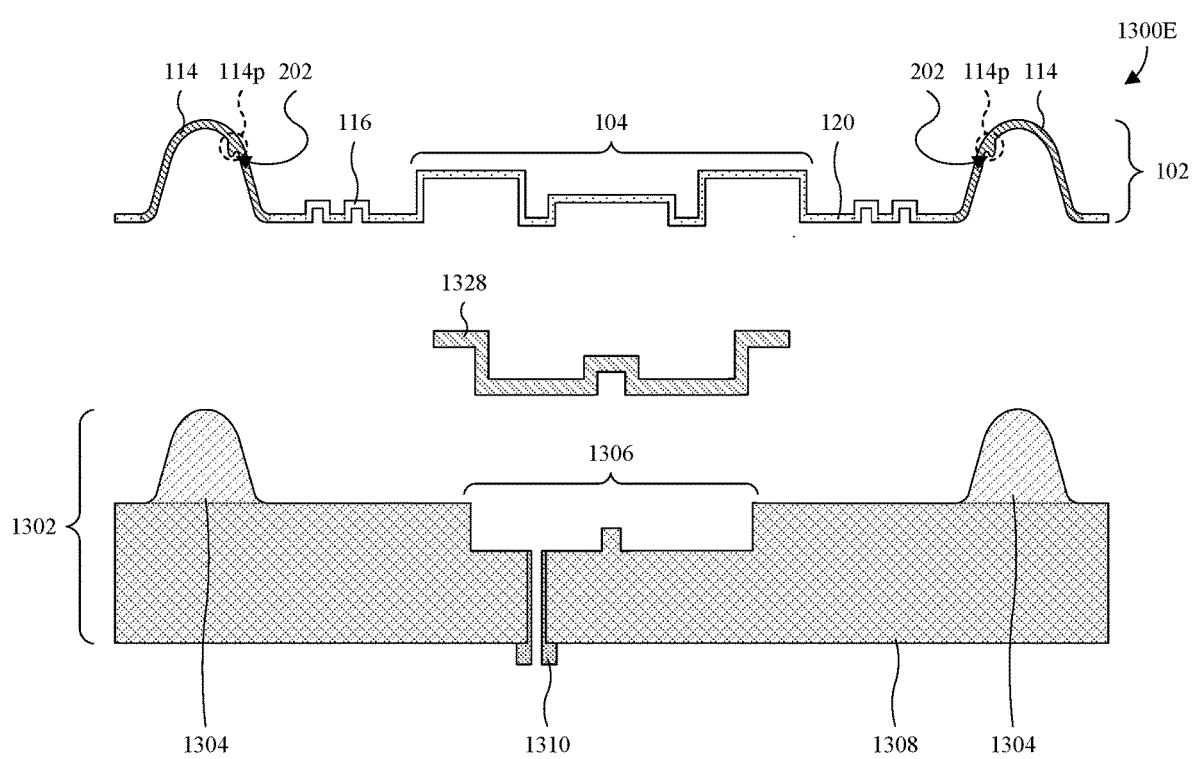

As illustrated by the cross-sectional view 1300E of FIG. 13E, the vacuum between the reusable vacuum bag 102 and the bottom plate 1302 is released, and the composite structure 1328 is removed from between the reusable vacuum bag 102 and the bottom plate 1302. In some embodiments, the vacuum is released by removing the cap 1330 (see FIG. 13D) from the vacuum port 1310 (see FIG. 13D). In some embodiments, the composite structure 1328 is removed by separating the reusable vacuum bag 102 and the bottom plate 1302 to expose the composite structure 1328, and subsequently pulling or pushing the composite structure 1328 off the reusable vacuum bag 102 and the bottom plate 1302.

Figure 14A:
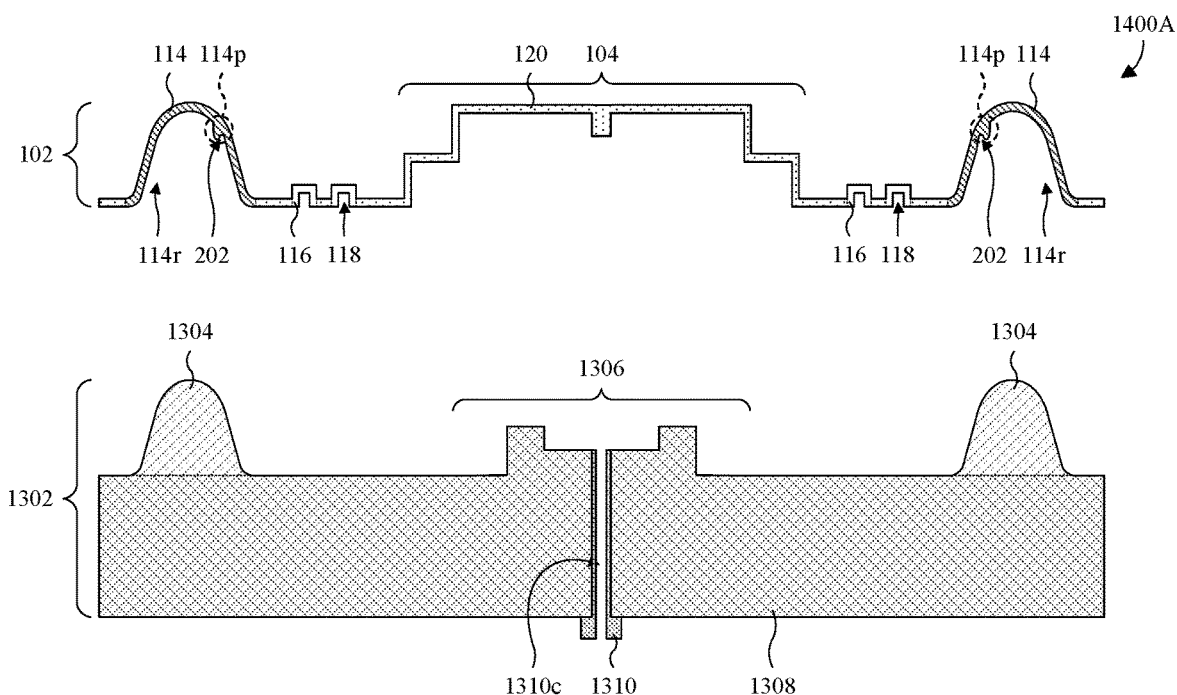
FIGS. 14A-14E illustrate a series of cross-sectional views of some second embodiments of the method of FIG. 12.
Figure 14B:
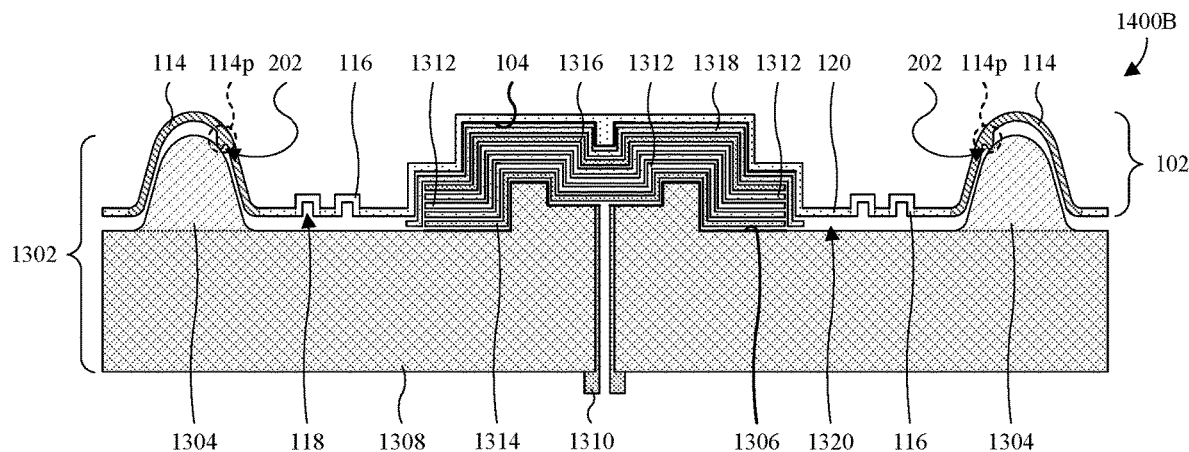
Figure 14C:
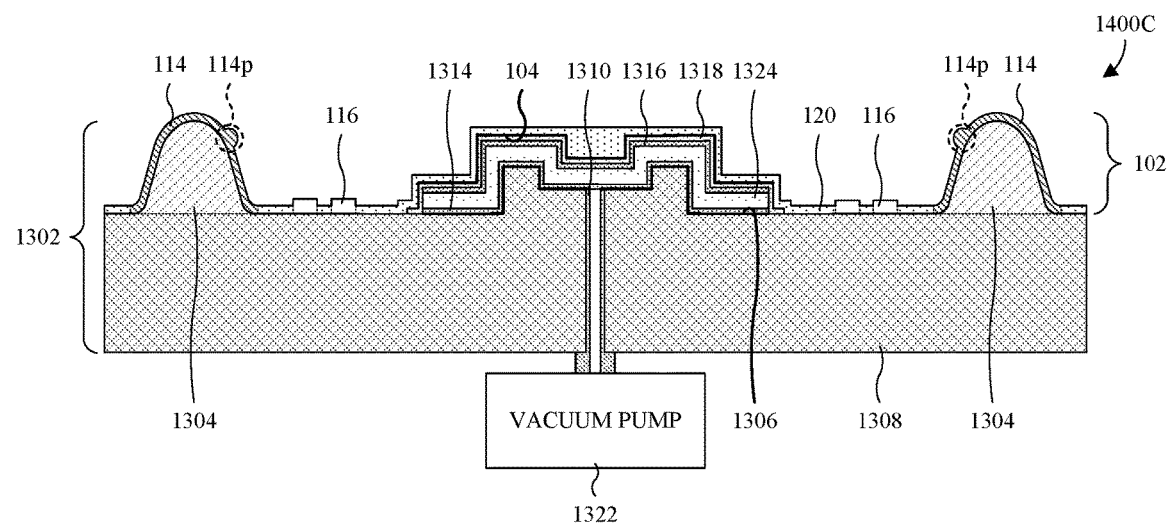
Figure 14D:
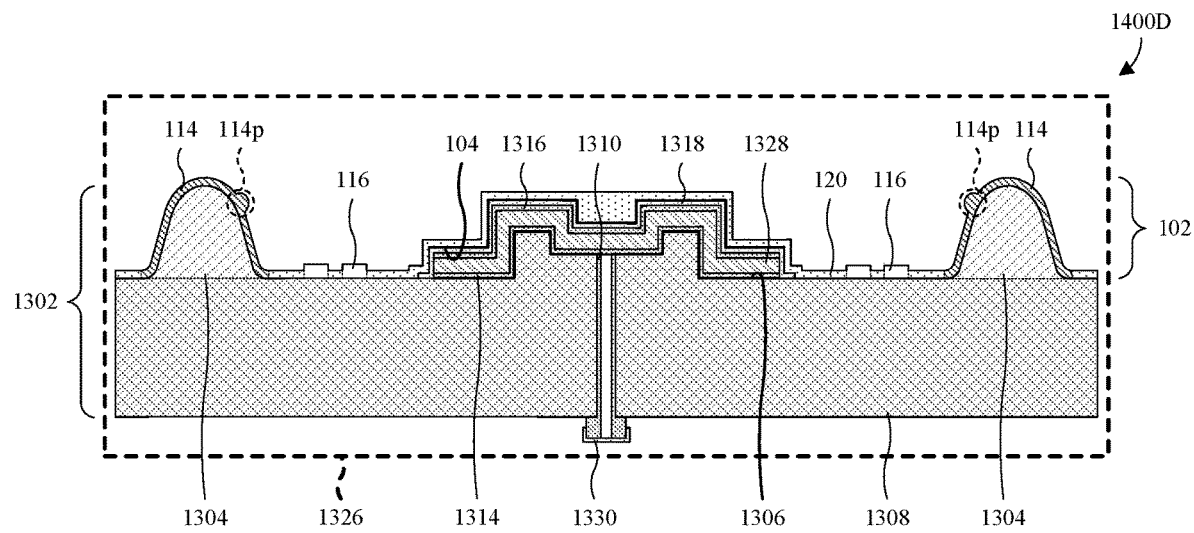
Figure 14E:
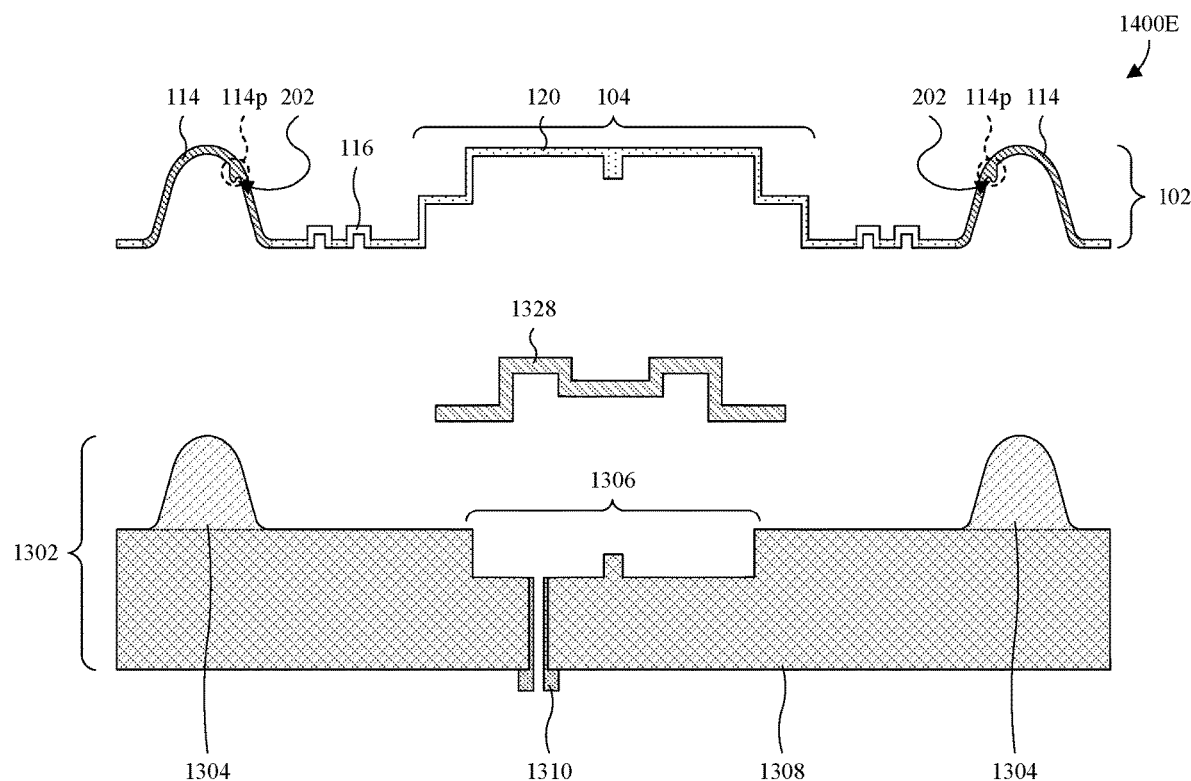

With reference to FIGS. 14A-14E, a series of cross-sectional views 1400A-1400E of some second embodiments of the method of FIG. 12 is provided. FIGS. 14A-14E are variants respectively of FIGS. 13A-13E in which the bottom plate pattern 1306 and the vacuum bag pattern 104 have been varied. For example, the bottom plate pattern 1306 of FIG. 13A is substantially defined by a recess in the bottom plate 1302, whereas the bottom plate pattern 1306 of FIG. 14A is substantially defined by an upward protrusion of the bottom plate 1302. Accordingly, FIGS. 14A-14E are respectively as FIGS. 13A-13E are described, but for the change in the bottom plate pattern 1306 and the vacuum bag pattern 104.

With reference to FIGS. 15A-15E, a series of cross-sectional views 1500A-1500E of some third embodiments of the method of FIG. 12 is provided. In contrast with the first and second embodiments of the method (illustrated by FIGS. 13A-13E and FIGS. 14A-14E), the third embodiments of the method have a different embodiment of the vacuum seal 114. Further, the third embodiments of the method have different embodiments of the bottom plate pattern 1306 and different embodiments of the vacuum bag pattern 104.

Figure 15A:
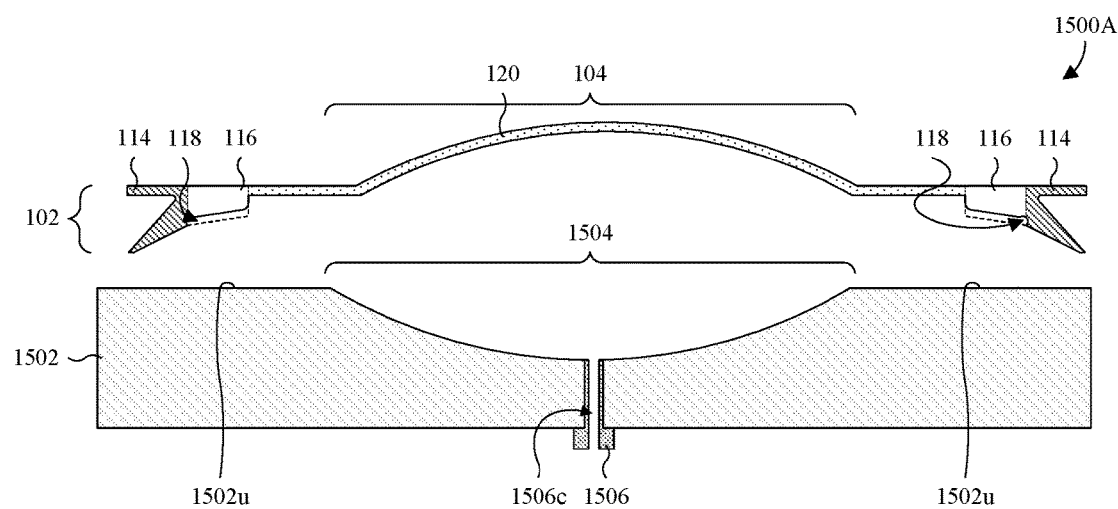
FIGS. 15A-15E illustrate a series of cross-sectional views of some third embodiments of the method of FIG. 12.

As illustrated by the cross-sectional view 1500A of FIG. 15A, a bottom plate 1502 and a reusable vacuum bag 102 are formed. The bottom plate 1502 may, for example, be formed as described at 1202 of FIG. 12. The reusable vacuum bag 102 may, for example, be formed as described as 1204 of FIG. 12.

The bottom plate 1502 is formed with an upper surface 1502u that is flat, and the reusable vacuum bag 102 is formed with a vacuum seal 114 configured to seal a cavity with the upper surface 1502u. The upper surface 1502u of the bottom plate 1502 has a pair of upper surface segments respectively on opposite sides of the bottom plate 1502, and the vacuum seal 114 has a pair of vacuum seal segments respectively on the opposite sides. The upper surface segments are configured to respectively seal the cavity with the vacuum seal segments. In some embodiments, the vacuum seal 114 and the upper surface 1502u of the bottom plate 1502 have ring-shaped top layouts or some other closed-path top layouts. The vacuum seal 114 may, for example, have a top layout as shown in FIG. 6B.

In some embodiments, the bottom plate 1502 is further formed with a bottom plate pattern 1504. In some embodiments, the bottom plate pattern 1504 is completely surrounded by the upper surface 1502u of the bottom plate 1502 when viewed top down. In some embodiments, the reusable vacuum bag 102 is further formed with a vacuum bag pattern 104 and/or a vacuum track 116. In some embodiments, the vacuum bag pattern 104 and/or the vacuum track 116 is/are completely surrounded by the vacuum seal 114 when viewed top down. The vacuum track 116 may, for example, have a top layout as shown in FIG. 6B.

Note that hashing of the vacuum seal 114 and hashing of the vacuum track 116 have been varied relative to each other and relative to a remainder 120 of the reusable vacuum bag 102 to emphasize these features. It is to be understood that the variation in hashing is not to be construed as limiting the composition of the reusable vacuum bag 102. The reusable vacuum bag 102 is a single, continuous piece of material free of seams and other discontinuities.

Also illustrated by the cross-sectional view 1500A of FIG. 15A, in some embodiments, a vacuum port 1506 is added to the bottom plate 1502. The vacuum port 1506 extends through the bottom plate 1502 and has a central channel 1506c through which to create a vacuum between the bottom plate 1502 and the reusable vacuum bag 102.

Figure 15B:
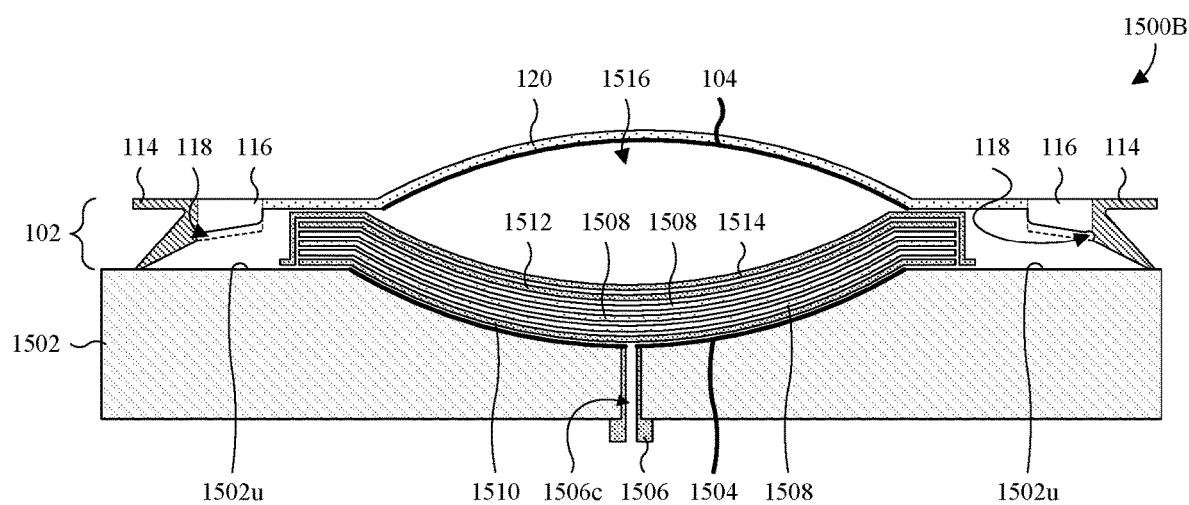

As illustrated by the cross-sectional view 1500B of FIG. 15B, a plurality of prepregs 1508 are stacked over the bottom plate 1502. In some embodiments, a lower release sheet 1510 is placed on the bottom plate 1502 and the prepregs 1508 are stacked over the lower release sheet 1510. In some embodiments, an upper release sheet 1512 and/or a breather sheet 1514 are stacked over the prepregs 1508.

Also illustrated by the cross-sectional view 1500B of FIG. 15B, the reusable vacuum bag 102 is placed over the bottom plate 1502, such that the reusable vacuum bag 102 covers the prepregs 1508 and the vacuum seal 114 contacts the upper surface 1502u of the bottom plate 1502. The contact between the vacuum seal 114 and the upper surface 1502u of the bottom plate 1502 defines a cavity 1516 between the reusable vacuum bag 102 and the bottom plate 1502, and within which the prepregs 1508 are arranged.

Figure 15C:
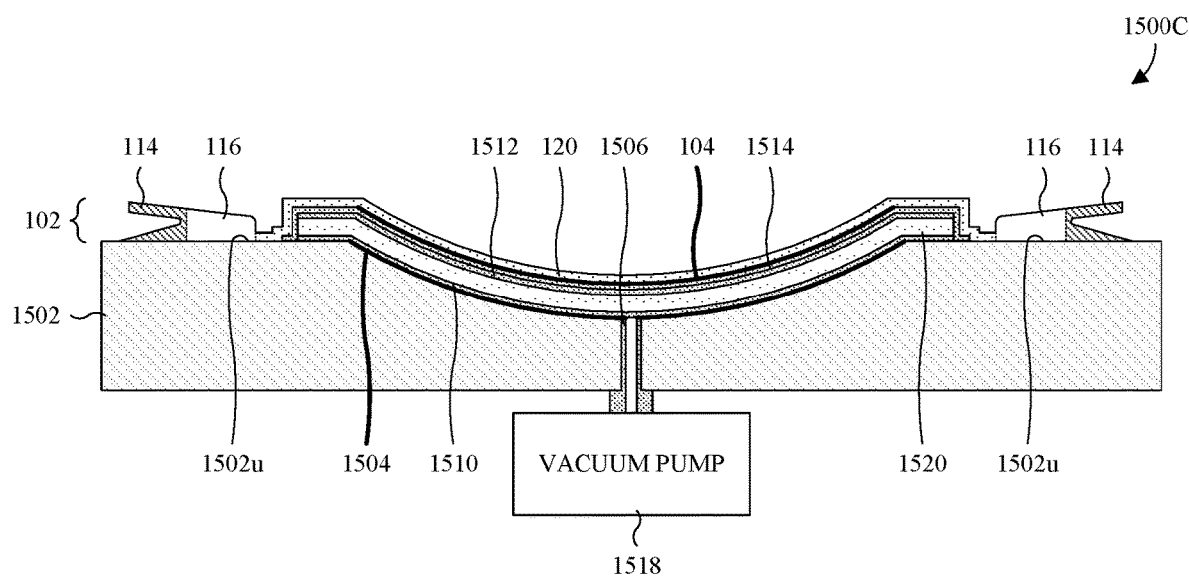

As illustrated by the cross-sectional view 1500C of FIG. 15C, the cavity 1516 (see FIG. 15B) is vacuumed. In some embodiments, the vacuuming is performed by a vacuum pump 1518 connected to the vacuum port 1506. The vacuuming causes a pressure differential between the cavity 1516 and an ambient environment of the cavity 1516, whereby the ambient environment presses the reusable vacuum bag 102 against the bottom plate 1502 and the prepregs 1508 (see FIG. 15B) to compress the prepregs 1508 into a common prepreg 1520. Further, the reusable vacuum bag 102 deforms to the bottom plate 1502 and the common prepreg 1520, whereby the vacuum track channels 118 (see FIG. 15B) may, for example, collapse. In embodiments in which the vacuum bag pattern 104 and/or the bottom plate pattern 1504 is/are present, the vacuuming transfers the vacuum bag pattern 104 and/or the bottom plate pattern 1504 to the common prepreg 1520.

During the vacuuming, the vacuum track channels 118 provide paths for the vacuum to reach and evenly distribute along the vacuum seal 114, thereby leading to a strong seal between the reusable vacuum bag 102 and the bottom plate 1502. In some embodiments, the reusable vacuum bag 102 has increased rigidity at the vacuum track channels 118 so the vacuum track channels 118 persist completely or mostly through the vacuuming. Such increased rigidity may, for example, be due sidewalls and/or to increased wall thickness.

Figure 15D:
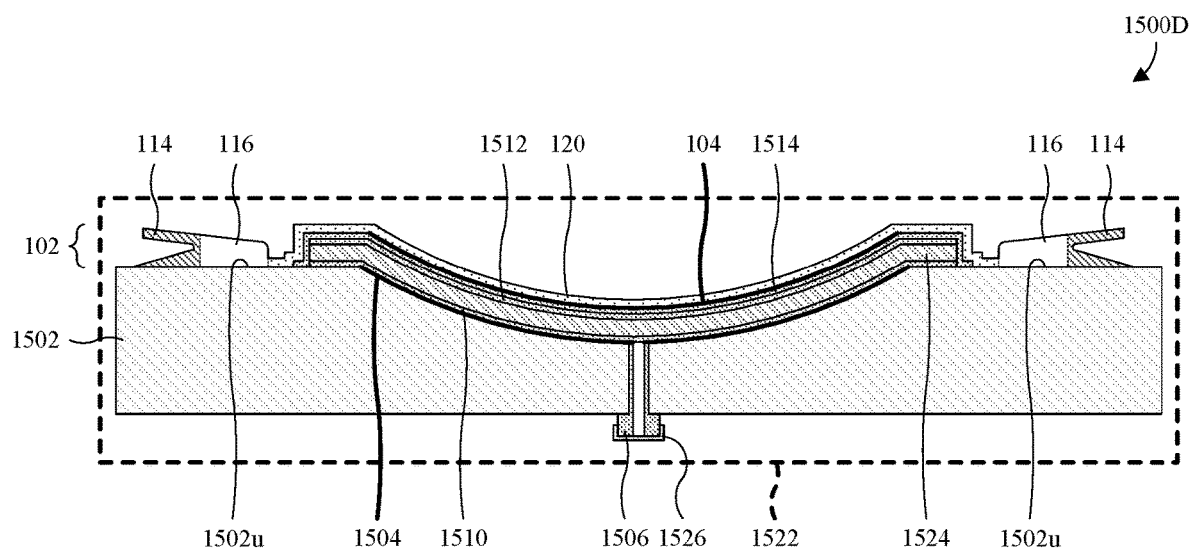

As illustrated by the cross-sectional view 1500D of FIG. 15D, the common prepreg 1520 (see FIG. 15C) is cured in a heating chamber 1522 to form a composite structure 1524. The heating chamber 1522 may, for example, be an autoclave, an oven, or some other heating chamber, and/or may, for example, heat the common prepreg 1520 to temperatures greater than about 200, 300, or 400° F. In some embodiments, a cap 1526 is secured to the vacuum port 1506 during the curing.

Figure 15E:
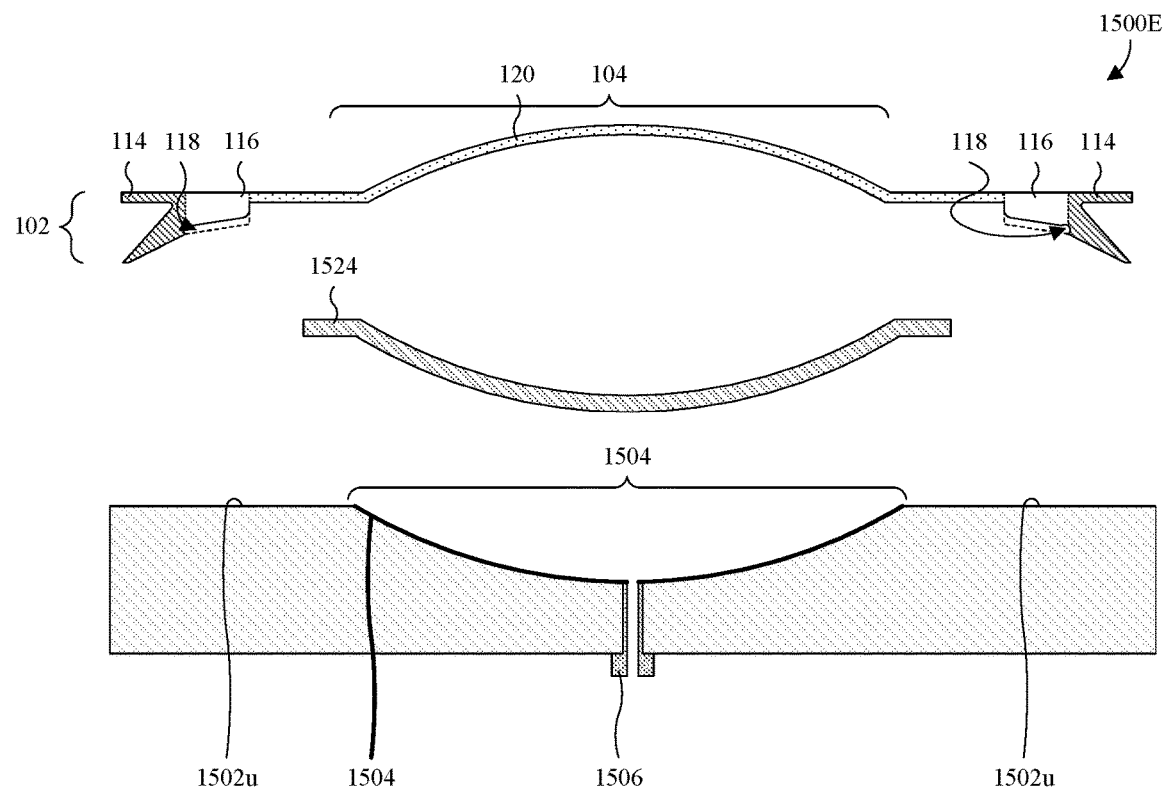

As illustrated by the cross-sectional view 1500E of FIG. 15E, the vacuum between the reusable vacuum bag 102 and the bottom plate 1502 is released, and the composite structure 1524 is removed from between the reusable vacuum bag 102 and the bottom plate 1502. In some embodiments, the vacuum is released by removing the cap 1526 (see FIG. 15D) from the vacuum port 1506. In some embodiments, the composite structure 1524 is removed by separating the reusable vacuum bag 102 and the bottom plate 1502 to expose the composite structure 1524, and subsequently pulling or pushing the composite structure 1524 off the reusable vacuum bag 102 and the bottom plate 1502.

In some embodiments, the present application provides a method including: providing a mold including a pair of plates, wherein the plates collectively define a cavity with layout of a reusable vacuum bag; adding a vacuum bag material to the cavity; curing the vacuum bag material within the cavity, wherein the curing forms the reusable vacuum bag; and removing the reusable vacuum bag from the mold. In some embodiments, the adding of the vacuum bag material includes injecting the vacuum bag material into the cavity under pressure. In some embodiments, the vacuum bag material includes silicone. In some embodiments, the vacuum bag material is a liquid material or a solid, pliable material. In some embodiments, the curing of the vacuum bag material includes heating the vacuum barrier material and the mold within a heating chamber. In some embodiments, the method further includes removing excess material from the reusable vacuum bag after the removing of the reusable vacuum bag from the mold. In some embodiments, the curing forms the reusable vacuum bag with an integrated vacuum seal or an integrated vacuum track. In some embodiments, the curing forms the reusable vacuum bag with an integrated pad, wherein the method further includes mounting a sensor or a vacuum port to the integrated pad after the curing.

In some embodiments, the present application further provides A reusable vacuum bag including: a flexible body, wherein the flexible body is a single, continuous piece of material; a vacuum seal integrated with the flexible body, wherein the vacuum seal extends laterally along a periphery of the flexible body in a closed path to surround a central area of the flexible body; and a vacuum track integrated with the flexible body, wherein the vacuum track is surrounded by the vacuum seal. In some embodiments, the flexible body includes cured silicone. In some embodiments, edges of the flexible body are rounded. In some embodiments, the vacuum track defines a plurality of vacuum track channels in the central area of the flexible body, wherein the vacuum track channels include a ring-shaped vacuum track channel and a plurality of line-shaped vacuum track channels, wherein the line-shaped vacuum track channels are laterally spaced in a ring-shaped pattern, and wherein the line-shaped vacuum track channels extend transverse to the ring-shaped vacuum track channel. In some embodiments, the vacuum seal has a top layout that is ring shaped, and further has a cross-sectional profile that is inverted U or V shaped. In some embodiments, the vacuum seal defines a recess on an underside of the flexible body, wherein the recess extends laterally along a boundary of the central area of the flexible body in a closed path. In some embodiments, the vacuum seal includes a protrusion in the recess, wherein the protrusion extends laterally along the boundary of the central area of the flexible body in the closed path. In some embodiments, the vacuum seal includes a seal body and a seal wiper, wherein the seal wiper and the seal body are continuous with each other and are angled relative to each other. In some embodiments, the vacuum track defines a ring-shaped channel directly bordering the seal wiper, wherein the vacuum track defines a line-shaped channel slanting upward directly from the ring-shaped channel towards the central area of the flexible body.

In some embodiments, the present application provides another method including: forming a reusable vacuum bag including an integrated vacuum seal, wherein the reusable vacuum bag is a single, continuous piece of material, and wherein the integrated vacuum seal extends laterally along a periphery of the reusable vacuum bag in a closed path; stacking multiple layers over a bottom plate; arranging the reusable vacuum bag over the bottom plate and the multiple layers, such that the vacuum seal surrounds the multiple layers and such that the reusable vacuum bag and the bottom plate define a cavity within which the multiple layers are arranged; and vacuum sealing the cavity to compress the multiple layers. In some embodiments, the multiple layers includes prepregs, wherein the method further includes curing the multiple layers while the cavity is vacuum sealed. In some embodiments, the integrated vacuum seal defines a recess on an underside of the reusable vacuum bag, wherein the bottom plate defines an upward protrusion on an upper side of the bottom plate, and wherein the vacuum seal mates with the upward protrusion at the recess to define the cavity.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method comprising:
    providing a mold comprising a pair of plates, wherein the plates collectively define a cavity with a layout of a reusable vacuum bag;
    adding a vacuum bag material to the cavity;
    curing the vacuum bag material within the cavity, wherein the curing forms the reusable vacuum bag, wherein the reusable vacuum bag has a bottom surface pattern and a pair of pads between which the bottom surface pattern is laterally arranged upon completion of the curing, wherein the pads have rectangular profiles with individual pad thicknesses that are larger than a thickness of directly adjoining portions of the reusable vacuum bag, and wherein the directly adjoining portions are continuous from each of the pads to the bottom surface pattern;
    removing the reusable vacuum bag from the mold; and
    after the removing and the curing, installing a vacuum port and a sensor respectively and directly on the pads, wherein the vacuum port extends completely through a corresponding one of the pads.

2. The method according to claim 1, wherein the adding of the vacuum bag material comprises injecting the vacuum bag material into the cavity under pressure.

3. The method according to claim 1, wherein the vacuum bag material comprises silicone.

4. The method according to claim 1, wherein the vacuum bag material is a liquid material or a solid, pliable material.

5. The method according to claim 1, wherein the curing of the vacuum bag material comprises heating the vacuum bag material and the mold within a heating chamber.

6. The method according to claim 1, further comprising:
    removing excess material from the reusable vacuum bag after the removing of the reusable vacuum bag from the mold.

7. The method according to claim 1, further comprising:
    performing a vacuum bagging process in which the reusable vacuum bag is employed to transfer the bottom surface pattern to prepregs, and to further compress the prepregs against a bottom plate, by creating a vacuum between the reusable vacuum bag and the bottom plate through the vacuum port.

8. The method according to claim 7, wherein the reusable vacuum bag has an integrated seal extending in a closed path around the pads and the bottom surface pattern, wherein the integrated seal comprises a wiper portion and a base portion both extending laterally away from the bottom surface pattern in a direction transverse to the closed path, wherein a thickness of the wiper portion decreases away from the bottom surface pattern, wherein the base portion overhangs the wiper portion and meets the wiper portion at an acute angle on an opposite side of the integrated seal as the bottom surface pattern, and wherein the acute angle decreases while creating the vacuum.

9. A method comprising:
    forming a reusable vacuum bag comprising an integrated vacuum seal, wherein the reusable vacuum bag is a single, continuous piece of material, wherein the integrated vacuum seal extends laterally along a periphery of the reusable vacuum bag in a closed path and defines a recess in a bottom surface of the reusable vacuum bag, wherein the bottom surface has an outer portion, an inner portion, and a recessed portion, wherein the inner and outer portions are outside the recess and the recessed portion is in and localized to the recess, and wherein the recessed portion extends from the outer portion to the inner portion and comprises a seal protrusion;
    stacking multiple layers over a bottom plate;
    arranging the reusable vacuum bag over the bottom plate and the multiple layers, such that the integrated vacuum seal surrounds the multiple layers and such that the reusable vacuum bag and the bottom plate define a cavity within which the multiple layers are arranged, wherein the bottom plate has a bottom plate protrusion protruding upward from a top surface of the bottom plate, wherein the bottom plate protrusion has a profile matching that of the recess, except for the seal protrusion, and wherein the seal protrusion directly contacts and spaces the inner and outer portions from the top surface; and
    vacuum sealing the cavity to compress the multiple layers, invert the seal protrusion, and bring the inner and outer portions into direct contact with the top surface.

10. The method according to claim 9, wherein the multiple layers comprise prepregs, and wherein the method further comprises curing the multiple layers while the cavity is vacuum sealed.

11. The method according to claim 9, wherein the forming of the reusable vacuum bag comprises:
    providing a mold comprising a pair of mold plates, wherein the mold plates collectively define a mold cavity with a layout of the reusable vacuum bag;
    adding a vacuum bag material to the mold cavity;
    curing the vacuum bag material within the mold cavity, wherein the curing forms the reusable vacuum bag; and
    removing the reusable vacuum bag from the mold.

12. The method according to claim 9, wherein the reusable vacuum bag has a central portion that is surrounded by the integrated vacuum seal and that defines a pattern, and wherein the vacuum sealing transfers the pattern from the reusable vacuum bag to the multiple layers.

13. A method comprising:
forming a vacuum bag from a vacuum bag material, wherein the forming comprises adding the vacuum bag material into a mold cavity and curing the vacuum bag material in the mold cavity while the mold cavity is sealed, wherein the mold cavity defines a layout of a vacuum seal and a layout of a vacuum track, such that the vacuum bag is formed with the vacuum seal and the vacuum track integrated into the vacuum bag, wherein the vacuum seal has a pair of segments at a periphery of the vacuum bag and respectively on opposite sides of the vacuum bag, and wherein the vacuum track extends from the vacuum seal to a central area of the vacuum bag;
arranging prepregs over a bottom plate;
arranging the vacuum bag with the central area overlying the prepregs and the vacuum seal directly contacting the bottom plate so as to define a vacuum cavity between the vacuum bag and the bottom plate, wherein the vacuum seal and the vacuum track are spaced from the prepregs; and
vacuum sealing the vacuum cavity to compress the prepregs;
wherein the vacuum track corresponds to a recess in a bottom of the vacuum bag and collapses during the vacuum sealing, such that a top surface of the recess comes into direct contact with the bottom plate during the vacuum sealing.

14. The method according to claim 13, wherein the bottom plate has a central area defining a pattern in the vacuum cavity, and wherein the vacuum sealing transfers the pattern from the bottom plate to the prepregs.

15. The method according to claim 13, wherein the mold cavity is defined by a pair of plates having an injection port, wherein a channel extends from the injection port to the mold cavity, wherein the vacuum bag forms with a channel portion filling the channel, and wherein the forming comprising:
removing the vacuum bag from the plates; and
removing the channel portion from the vacuum bag.

16. The method according to claim 13, wherein the vacuum seal has an inverted U-shaped profile mating with a protrusion on the bottom plate, wherein the vacuum bag is formed with a plurality of ring-shaped vacuum tracks and a plurality of line-shaped vacuum tracks, wherein the ring-shaped vacuum tracks are spaced from each other and surround the central area of the vacuum bag, wherein the line-shaped vacuum tracks are spaced in a ring-shaped pattern and extend crosswise to the ring-shaped vacuum tracks from the central area to the vacuum seal.

17. The method according to claim 13, wherein the vacuum seal has a base portion and a wiper portion respectively at a top and the bottom of the vacuum bag, wherein the wiper portion is at an acute angle relative to the base portion and decreases in thickness towards the periphery of the vacuum bag, wherein the vacuum seal comprises a ring-shaped vacuum track extending laterally in a closed path around the central area of the vacuum bag and extending vertically into the bottom of the vacuum bag to a first depth, and wherein the vacuum track extends vertically into the bottom of the vacuum bag to a second depth less than the first depth and further extends laterally from the ring-shaped vacuum track towards the central area.

18. The method according to claim 17, wherein the base portion overhangs the wiper portion, and meets the wiper portion at the acute angle, on an opposite side of the vacuum seal as the central area, wherein the ring-shaped vacuum track corresponds to a ring-shaped recess in the bottom of the vacuum bag and directly contacts a sidewall of the wiper portion between the wiper portion and the central area, wherein the vacuum track corresponds to a line-shaped recess in the bottom of the vacuum bag that extends from the ring-shaped recess in a direction transverse to the ring-shaped recess.

19. The method according to claim 13, wherein the vacuum bag has a uniform thickness across a majority of the vacuum bag and further has a pair of sidewalls bordering and orientated at an angle less than about 60 degrees relative to each other, and wherein a thickness of the vacuum bag is greater than the uniform thickness at the sidewalls.

20. The method according to claim 13, wherein a bottommost surface vacuum seal and a bottommost surface of the vacuum track are level with each other.

* * * * *